(12) United States Patent
Baker et al.

(10) Patent No.: US 11,916,909 B2
(45) Date of Patent: *Feb. 27, 2024

(54) METHOD, APPARATUS, AND COMPUTER PROGRAM PRODUCT FOR DETERMINING ACCESS CONTROL PARAMETER DISCREPANCIES IN GROUP-BASED COMMUNICATION CHANNELS WITH A GROUP-BASED COMMUNICATION SYSTEM

(71) Applicant: Salesforce, Inc., San Francisco, CA (US)

(72) Inventors: Corey Baker, New Westminster (CA); Bertrand Fan, San Francisco, CA (US); Salman Suhail, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/316,081

(22) Filed: May 10, 2021

(65) Prior Publication Data

US 2021/0266278 A1 Aug. 26, 2021

Related U.S. Application Data

(63) Continuation of application No. 15/844,002, filed on Dec. 15, 2017, now Pat. No. 11,005,793.

(51) Int. Cl.
*H04L 29/06* (2006.01)
*G06F 16/951* (2019.01)
(Continued)

(52) U.S. Cl.
CPC ............ *H04L 63/10* (2013.01); *G06F 16/951* (2019.01); *G06Q 10/10* (2013.01); *H04L 12/185* (2013.01);
(Continued)

(58) Field of Classification Search
CPC ..... H04L 63/10; H04L 63/104; H04L 63/101; H04L 63/102; H04L 63/08
See application file for complete search history.

(56) References Cited

U.S. PATENT DOCUMENTS

| | | | | |
|---|---|---|---|---|
| 4,604,694 A | * | 8/1986 | Hough | G06F 9/52 710/200 |
| 2002/0124053 A1 | * | 9/2002 | Adams | G06F 9/468 709/219 |

(Continued)

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
(Continued)

*Primary Examiner* — Dao Q Ho
(74) *Attorney, Agent, or Firm* — Holland & Hart LLP

(57) ABSTRACT

This disclosure describes a group-based communication system comprising a group-based communication server and a group-based communication repository. The group-based communication server manages access control parameter discrepancies between a group-based communication channel and a requested resource that is disposed in communication with the group-based communication channel.

20 Claims, 11 Drawing Sheets

(51) Int. Cl.
| | | |
|---|---|---|
| *G06Q 10/10* | (2023.01) | |
| *H04L 9/40* | (2022.01) | |
| *H04L 12/18* | (2006.01) | |
| *H04L 51/212* | (2022.01) | |
| *H04L 51/08* | (2022.01) | |

(52) U.S. Cl.
CPC .......... H04L 51/212 (2022.05); H04L 63/101 (2013.01); H04L 51/08 (2013.01)

(56) References Cited

U.S. PATENT DOCUMENTS

| | | | | |
|---|---|---|---|---|
| 2014/0047048 | A1* | 2/2014 | Ail | H04L 12/2809 709/206 |
| 2015/0326522 | A1* | 11/2015 | Pu | G06Q 50/01 709/206 |
| 2016/0110555 | A1* | 4/2016 | Kuo | G06F 21/62 726/30 |
| 2018/0287982 | A1* | 10/2018 | Draeger | H04L 51/216 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014, 2:48 PM) 8 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", FUJITSU Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https:/mastersofscale.com/#/stewart-butterfield-the-big-pivot/, (dated Jan. 17, 2018) 27 pages.

* cited by examiner

304

| 306<br>Global ID | 308<br>Full Name Value | 310<br>Email Address | 312<br>Group ID |
|---|---|---|---|
| W12345678 | Mary James | maryj@acme.com | Security |
|  |  | maryj@gmail.com | Mobile |
| W22222222 | Walter White | waltw@acme.com | International Sales |
| W33333333 | David Le | dle33@gmail.com | Domestic Sales |

METHOD, APPARATUS, AND COMPUTER PROGRAM PRODUCT FOR DETERMINING ACCESS CONTROL PARAMETER DISCREPANCIES IN GROUP-BASED COMMUNICATION CHANNELS WITH A GROUP-BASED COMMUNICATION SYSTEM

RELATED APPLICATION

This patent application is a continuation application claiming priority benefit, with regard to all common subject matter, of U.S. patent application Ser. No. 15/844,002, filed Dec. 15, 2017, now U.S. Pat. No. 11,005,793, issued May 11, 2021, and entitled "METHOD, APPARATUS, AND COMPUTER PROGRAM PRODUCT FOR DETERMINING ACCESS CONTROL PARAMETER DISCREPANCIES IN GROUP-BASED COMMUNICATION CHANNELS WITH A GROUP-BASED COMMUNICATION SYSTEM." The identified earlier-filed patent application is hereby incorporated by reference in its entirety into the present application.

BACKGROUND

An enterprise may support communication and collaboration among users across the enterprise. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

The disclosure relates to a group-based communication server, within a group-based communication system, comprising at least a processor, and a memory associated with the processor having computer coded instructions therein, with the computer instructions configured, when executed by the processor, may cause the group-based communication server to receive, from a client device, a group-based messaging communication. The group-based messaging communication may comprise a group-based messaging communication channel identifier to indicate a group-based communication channel of a plurality of group-based communication channels. The group-based messaging communication may further comprise a resource request that identifies a requested resource and a resource address. The computer instructions may be configured to, when executed by the processor, further cause the group-based communication server to determine, based on the received resource request, requested resource access control parameters for accessing the resource address. The computer instructions may be configured to, when executed by the processor, further cause the group-based communication server to determine, based on the received group-based messaging communication channel identifier, group-based communication channel access control parameters. The computer instructions may be configured to, when executed by the processor, further cause the group-based communication server to determine, based on a comparison of the requested resource access control parameters and the group-based communication channel access control parameters, a list of non-allowed global identifiers that represent members of the group-based communication channel that are precluded from accessing the requested resource.

In another embodiment, the computer instructions may be configured to, when executed by the processor, further cause the group-based communication server to determine, based on group-based communication channel access control parameters, one or more authorized group identifiers that identify groups that are authorized to access the group-based communication channel. The computer instructions may be configured to, when executed by the processor, further cause the group-based communication server to query, using the authorized group identifiers, a group-based communication repository to determine one or more global identifiers associated with user profile data that comprises an authorized group identifier.

In another embodiment, the computer instructions may be configured to, when executed by the processor, further cause the group-based communication server to query, using the one or more global identifiers, the group-based communication repository to determine an email address corresponding to each of the one or more global identifiers and compare, the retrieved email addresses with requested resource access control parameters to determine the list of non-allowed global identifiers.

In another embodiment, the computer instructions may be configured to, when executed by the processor, further cause the group-based communication server to determine if the list of non-allowed global identifiers includes at least one entry; and transmit, in response to determining that the list of non-allowed global identifiers includes at least one entry, to the client device, a change request prompt object.

In another embodiment, the change request prompt object comprises the group-based communication channel identifier and a requested resource identifier.

In another embodiment, the change request prompt object is configured to cause the client device to display a requested resource access control parameters change interface.

In another embodiment, the requested resource access control parameters change interface comprises a requested resource identification portion and a change option selection interface.

In another embodiment, the computer instructions may be configured to, when executed by the processor, further cause the group-based communication server to receive a change option selection indication from the client device in response to user engagement of the change option selection interface and transmit a request resource access control parameters change object to the resource address associated with the requested resource.

In another embodiment, the computer instructions may be configured to, when executed by the processor, further cause the group-based communication server to receive an access link object from the client device in response to user engagement of the change option selection interface, and transmit the access link object to a second client device, wherein the access link object is configured to cause the second client device to render an authorized resource interface in the group-based communication channel.

In another embodiment, the requested resource is a uniform resource locator (URL).

BRIEF DESCRIPTION OF THE DRAWINGS

Figure 1:
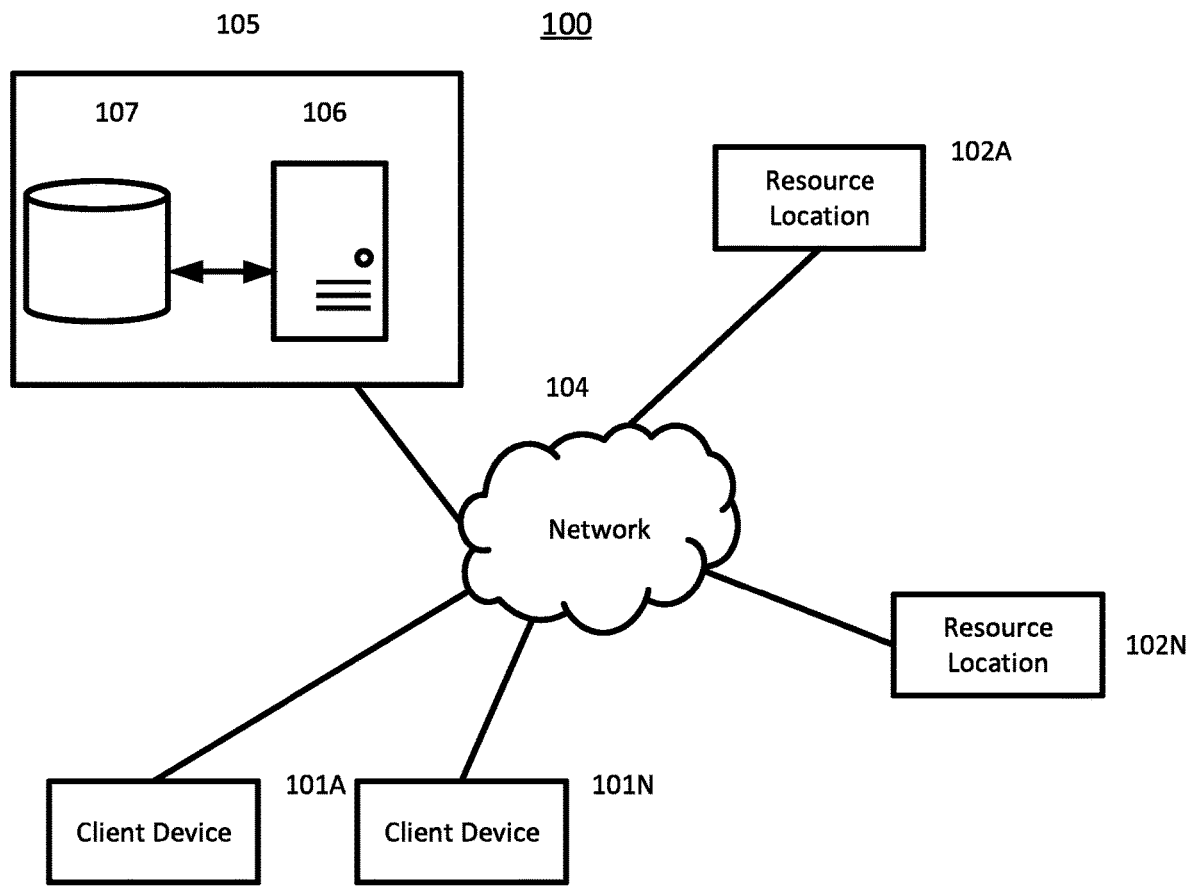
Figure 2:
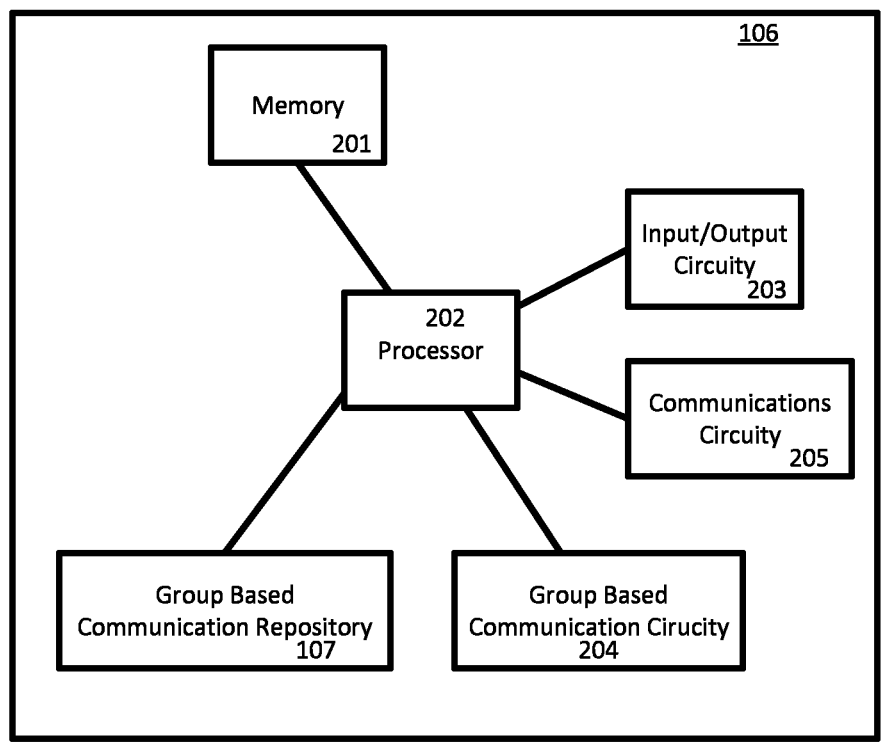
Figures 3A, 3B:
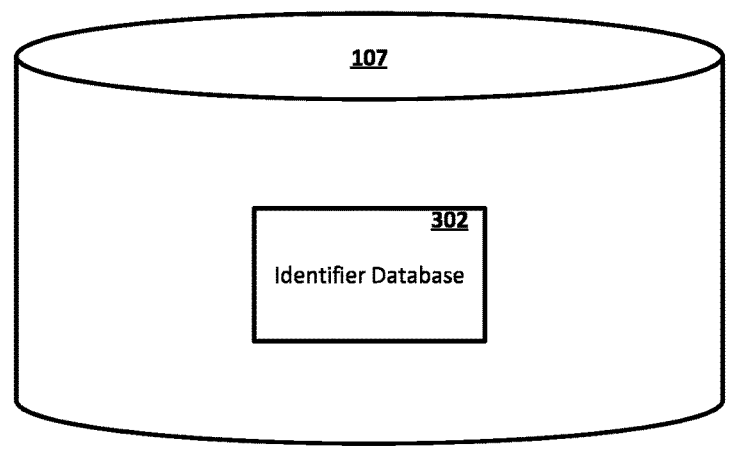
Figure 4A:
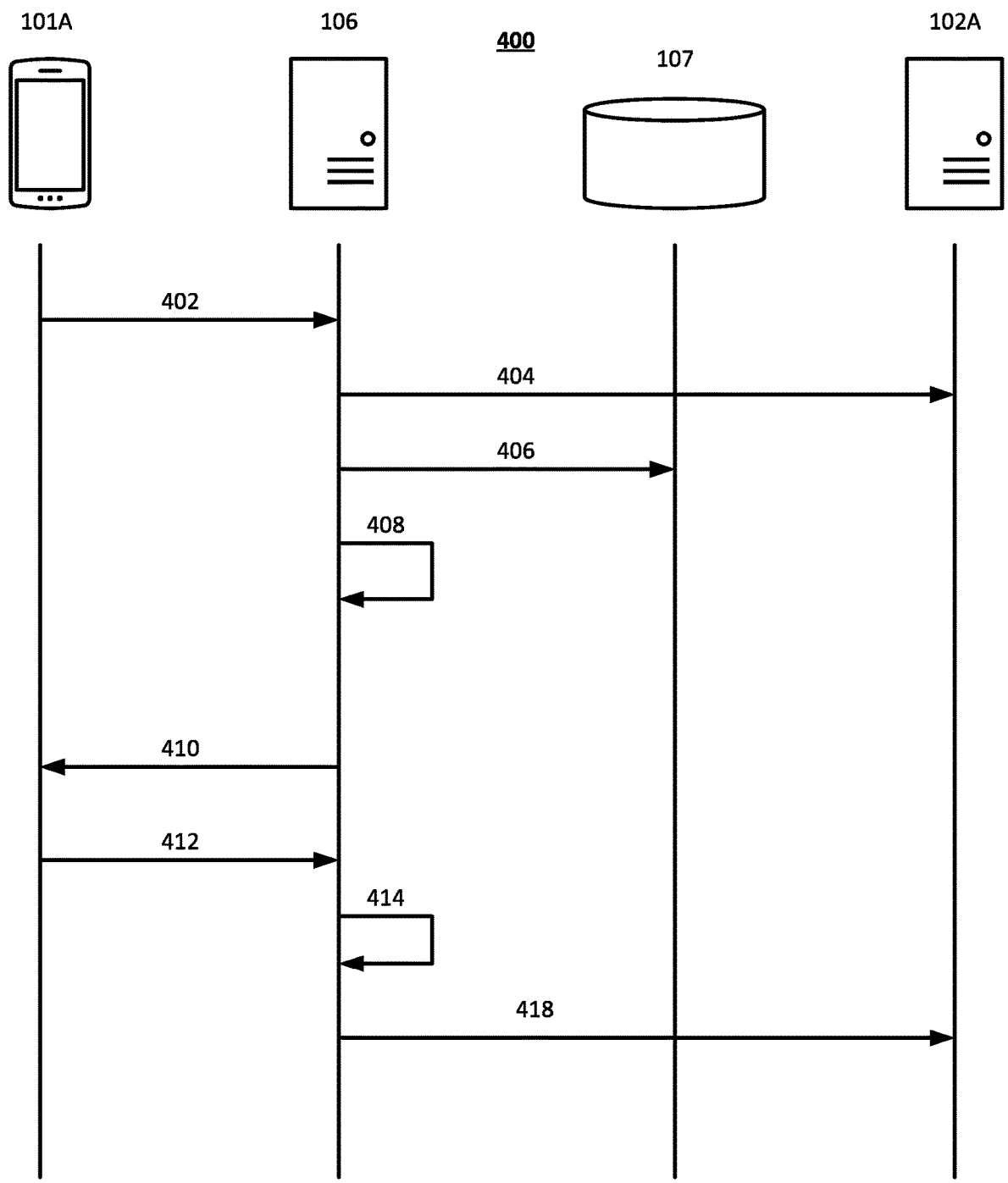
Figure 4B:
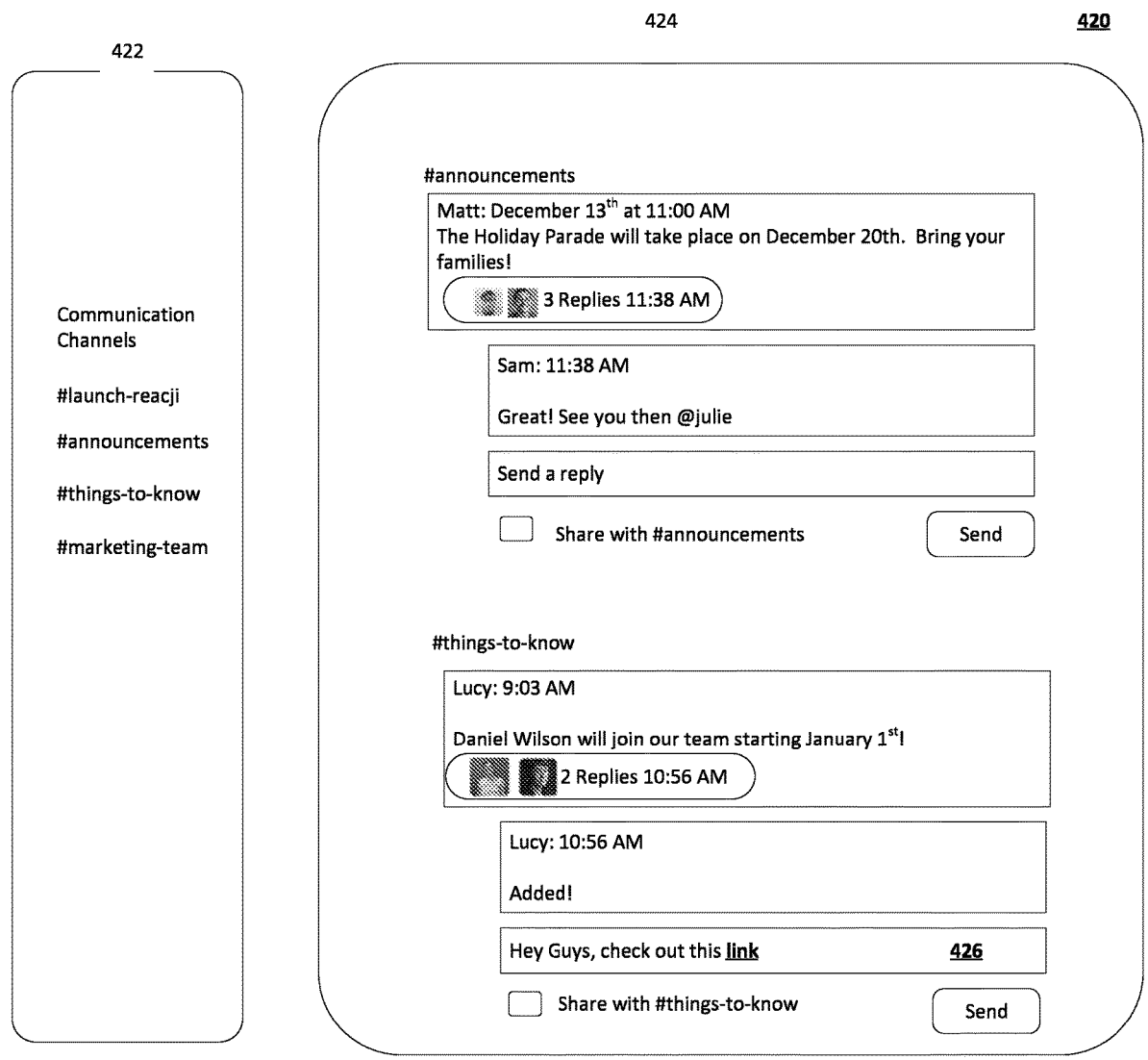
Figure 5:
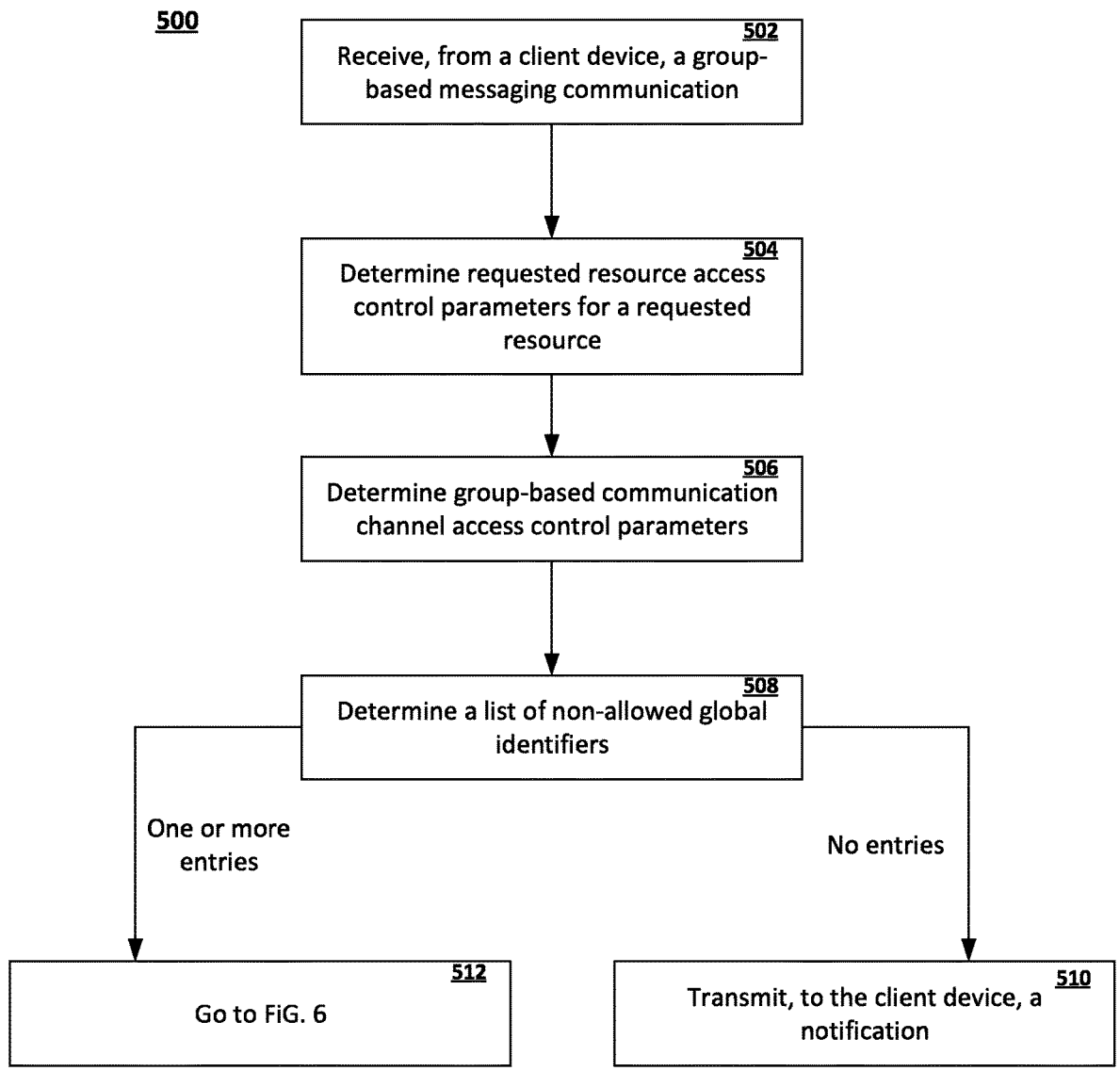
Figure 6:
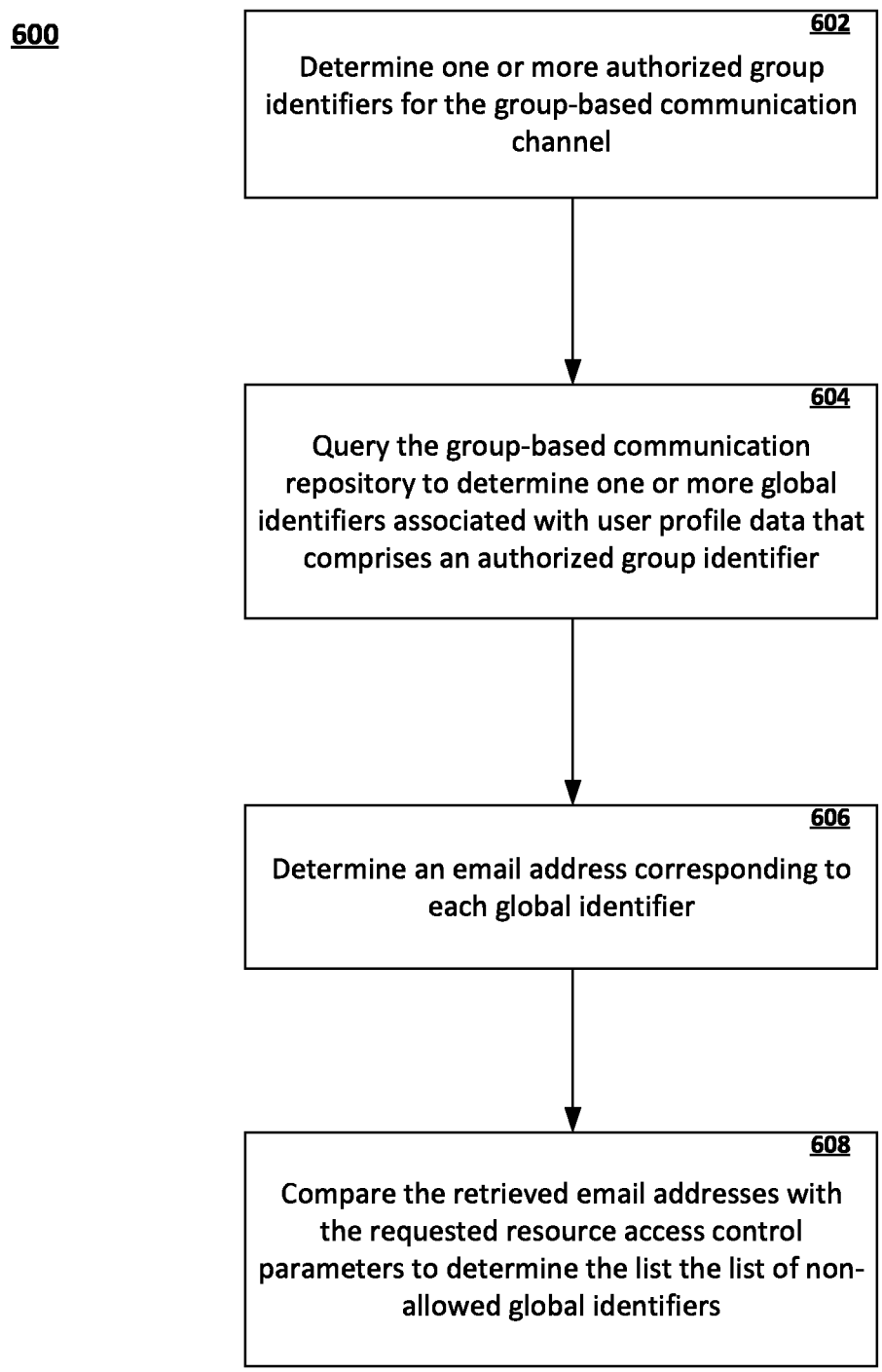
Figure 7:
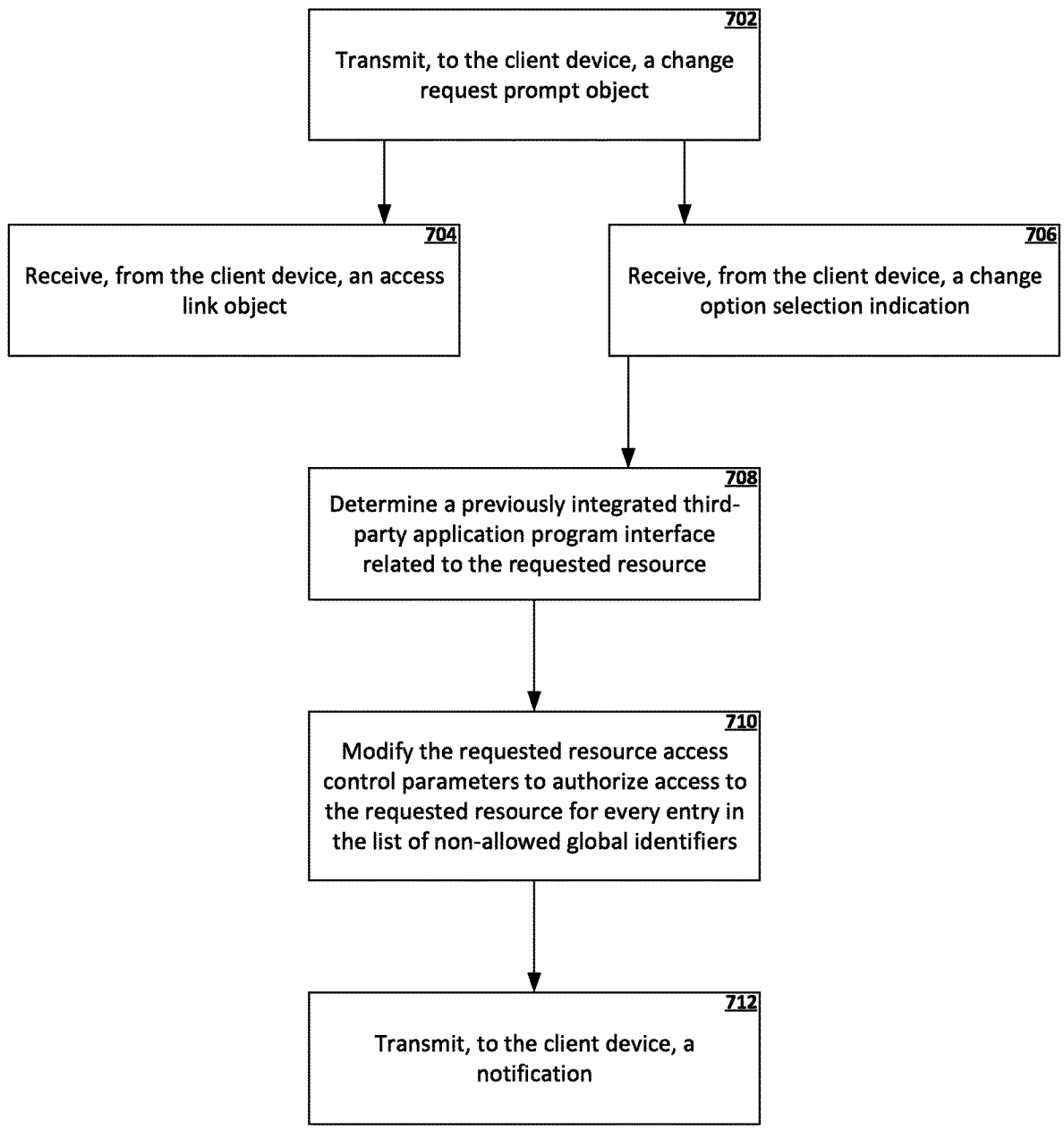
Figure 8A:
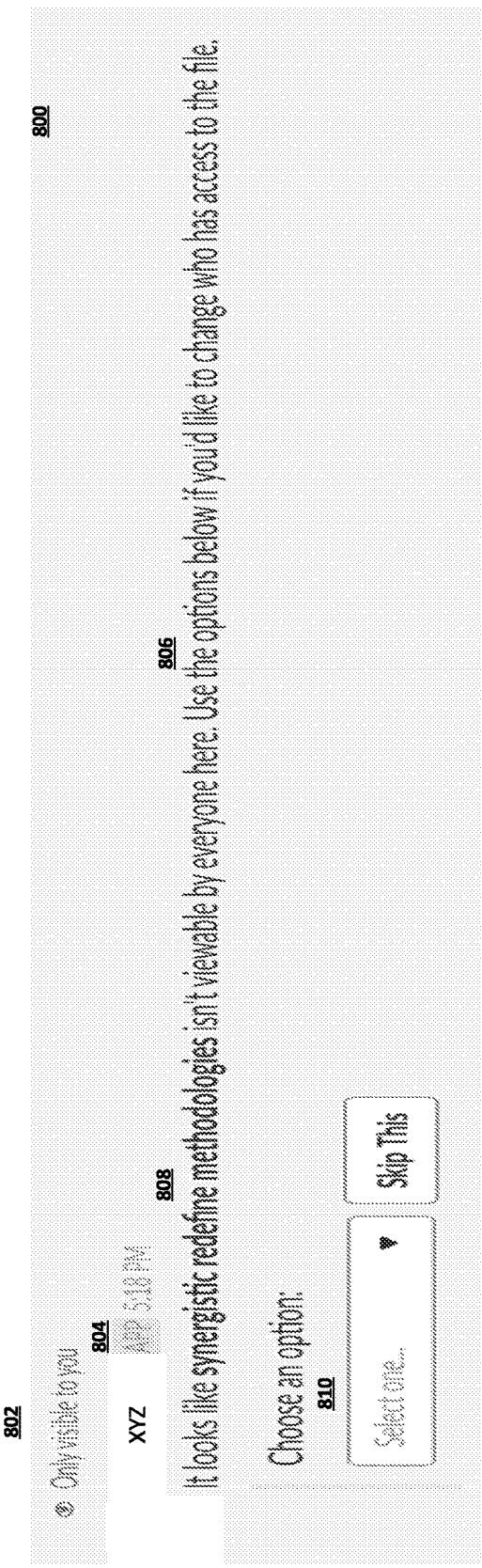
Figure 8B:
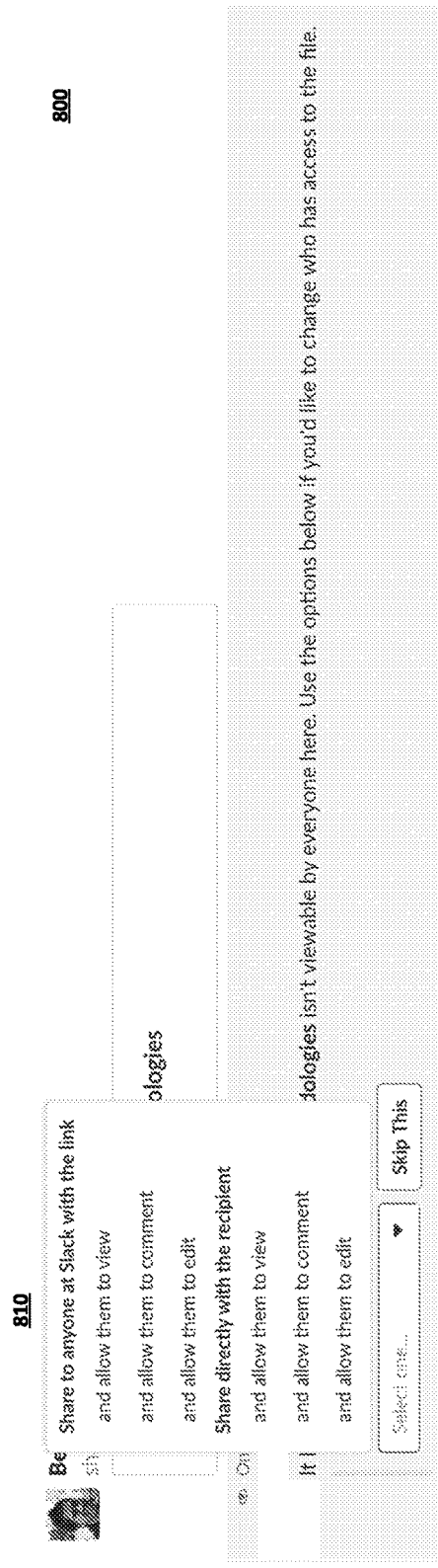
Figure 8C:
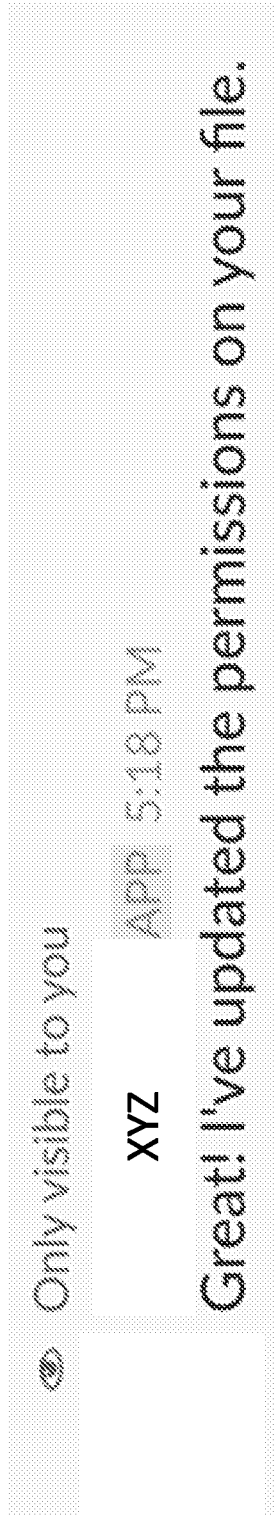
Figure 9:
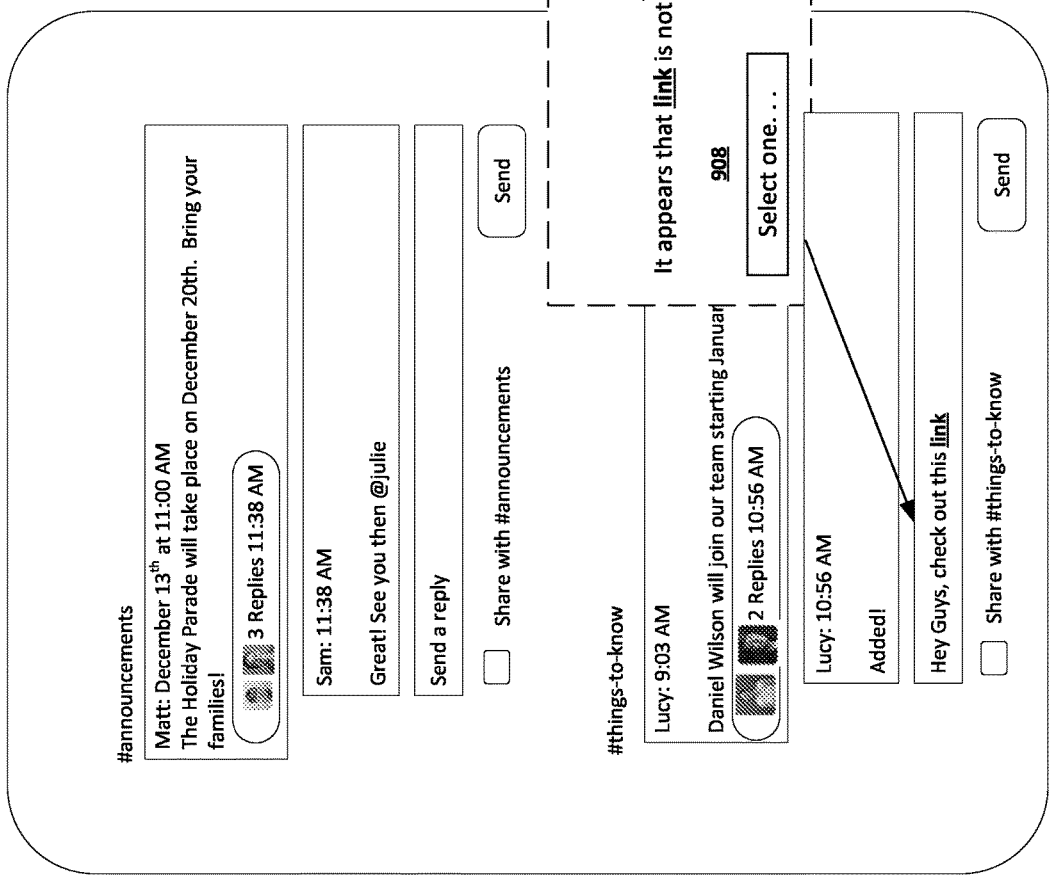

Having thus described the disclosure in general terms, reference will now be made to the accompanying drawings, which are not necessarily drawn to scale, and wherein:

FIG. 1 illustrates an exemplary group-based communication system within which embodiments of the present disclosure may operate;

FIG. 2 illustrates an exemplary processing circuitry that may be utilized by one or more apparatuses of the present disclosure;

FIG. 3A illustrates an exemplary embodiment of a group-based communication repository;

FIG. 3B illustrates an exemplary data table located in an identifier database within a group-based communication repository;

FIG. 4A illustrates an exemplary process performed within a group-based communication system according to embodiments of the present disclosure;

FIG. 4B illustrates an exemplary group-based communication interface according to embodiments of the present disclosure;

FIG. 5 illustrates an exemplary process performed by a group-based communication server according to embodiments of the present disclosure;

FIG. 6 illustrates an exemplary process performed by a group-based communication server according to embodiments of the present disclosure;

FIG. 7 illustrates an exemplary process performed by a client device, a group-based communication repository, group-based communication server, and a resource location according to embodiments of the present disclosure;

FIG. 8A illustrates an exemplary requested resource access control parameters change interface according to embodiments of the present disclosure;

FIG. 8B illustrates an exemplary requested resource access control parameters change interface according to embodiments of the present disclosure;

FIG. 8C illustrates an exemplary group-based communication interface according to embodiments of the present disclosure; and FIG. 9 illustrates an exemplary group-based communication interface according to embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

This disclosure describes a system for determining and resolving access control parameter discrepancies in a group-based communication channel. Current communication mechanisms such as email, chatrooms, basic mobile phone text messaging, and the like allow authorized users of the communication mechanism to send and receive messages with other authorized users of the communication mechanism. However, current communication mechanisms do not ensure that each authorized user of the communication mechanism is authorized to access a file or a link to a file that may be included in a message configured for display within the communication mechanism. The situation may occur where a user is authorized to communicate in a communication mechanism but is not authorized to view all communications within the communication mechanism. By not having access to a file or link to a file within the communication mechanism, one or more authorized users of the communication mechanism may not be allowed to fully collaborate with other authorized users. Furthermore, the originator of the message containing the file or link to the file may not be aware that the shared file or link to the file is not accessible to authorized users of the communication mechanism.

There are several technical issues with current communication mechanisms. Current communication mechanisms are not configured to determine access control parameters associated with an external file or a link to an external file. These same communication mechanisms are also not configured to resolve any access control parameter discrepancies within a collaborative environment. Without an access control parameter determination, the originator of the message containing the file or link to a link to file would have to either receive an indication from an authorized user of the communication mechanism indicating that he does not have access or the originator of the message would have to manually check the access control parameters of the file or link of the file himself. Then once a discrepancy is discovered, the user would, without advanced notification from the communication mechanism, change the access control parameters of the file or link to the file manually, which is typically done by manually accessing a third-party server.

Furthermore, a user may not know an identifier associated with each authorized user in order to give them desired access to the file or link to the file. In addition, even if the user did know each identifier associated with each user, there may be a vast amount of authorized users to the communication mechanism.

In alternative approaches, a user may attach a local copy of an external file to a communication message and distribute the message to intended recipients. However, this approach effectively duplicates the transmitted file for each intended recipient, which places a considerable drain on system resources and precludes effective collaboration (i.e., each recipient is allowed to comment or edit their own local copy of the attached document).

As can be seen the current processes of identifying and remedying access control parameter discrepancies requires unnecessary monitoring, attention, and steps by the originator of a message. This disclosure improves the functionality of collaborative communication systems by utilizing one or more methods and apparatuses to modify the security parameters of a file or a link to a file to comply with security parameters of a collaborative environment.

Terms

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "user" should be understood to refer to an individual, group of individuals, business, organization, and the like. The users referred to herein access a group-based communication or messaging system using client devices.

The term "client device" refers to computer hardware and/or software that is configured to access a group-based communication system made available by a group-based communication server. The group-based communication server is often (but not always) on another computer system, in which case the client device accesses the group-based communication system by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, a global identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messaging communications, a plurality of emojis, a plurality of conversations, a plurality of conversation topics, an avatar, an email address, a real name (e.g., John Doe), a username (e.g., jdoe), a global identifier, a password, a real name, a time zone, job, a user status value, and the like. The user account details can include a subset designation of user credentials, such as, for example, login information for the user including the user's username and password.

The terms "group-based communication channel identifier" and "channel identifier" refer to one or more items of data by which a group-based communication channel may be identified. For example, a group-based communication channel identifier may comprise ASCII text, a pointer, a memory address, and the like.

The term "group identifier" refer to one or more items of data by which a group within a group-based communication system may be identified. For example, a group identifier may comprise ASCII text, a pointer, a memory address, and the like.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Each such interface being accessible of distinct groups of users (e.g., Slack employees and ACME employees, respectively, in the enterprise context). Example group-based communication systems comprise supporting servers, client devices, and external applications.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

As used herein, the terms "group-based communication channel" and "channel" refer to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) may be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps.

As used herein, the term "group-based messaging communication" or "messaging communication" refers to any electronically generated digital messaging object provided by a user using a client device and that is configured for display within a group-based communication channel. Group-based messaging communications may include any text (including a resource request), image, video, audio or combination thereof provided by a user (using a client device). For instance, a user may provide a group-based message that includes text as well as an image and a video within the group-based message as group-based message contents. In such a case, the text, image, and video would comprise the digital messaging object that is sent from the client device and eventually rendered, as a group-based messaging communication, within a group-based communication channel. Each digital messaging object supported by the group-based communication system includes metadata comprising the following: a sending user identifier, a group-based message identifier, group-based message contents, a group identifier, and a group-based communication channel identifier. The preceding metadata is referred to as messaging communication information, which is defined in greater detail below. Each of the foregoing identifiers may comprise ASCII text, a pointer, a memory address, and the like.

The terms "sending user identifier" and "originator identifier" refer to one or more items of data by which the originator of a request (e.g., resource request) may be identified. The originator identification may be an email address, user identifier, global identifier, full name value, display name value, group identifier, an IP address, or any other type of information that can identify a requesting entity.

Group-based communication system users are organized into organization groups (e.g., Slack Corporation employees, ACME Corporation employees, etc.) and each organization group may have one or more group-based communication interfaces to which users may be assigned or which the users may join. A group identifier may be used to facilitate access control for a group-based message (e.g., access to the group-based message, such as having the group-based message return as part of search results in response to a search query, may be restricted to those users having the group identifier associated with their user profile) . The group identifier may be used to determine context for the group-based channels or to designate a default group-based channel list for a given user. The group identifier may be associated with a description of the group, such as the name of an organization and/or a brief description of the organization.

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a group-based message (e.g., access to the group-based message, such as having the group-based messaging communication return as part of search results in response to a search query, may be restricted to those users having the group-based communication channel identifier associated with their user profile, or who have the ability to join a particular group-based communication channel). The group-based communication channel identifier may be used to determine context for the group-based message (e.g., a description of the group-based communication channel, such as a description of a project discussed in the group-based communication channel, may be associated with the group-based communication channel identifier).

As used herein, the term "resource request" refers any electronically generated digital content object, such as text, which refers to an identification of a resource, such as document, attachment, image, video, website, and the like, remote from a client device. The resource request is generated at a client device and provided to a group-based communication server in a messaging communication (i.e., within a digital messaging object sent from a client device).

The resource request may be a part of or otherwise associated with a messaging communication. In one example, a resource request comprises a uniform resource locator (URL) identifying a requested resource and a resource address. The term "requested resource" refers to the document, attachment, image, video, website, data, content, information, or service the resource request is requesting. The term "resource address" refers to the network location of the requested resource. For example, a resource request in the form of a URL "http://logo.ACME.com" is a resource request for the "logo" of "ACME." The resource address is the address of the URL. In some examples, the resource request also comprises an intranet domain. For example, the request may include https://intranet/documents/logo.

As used herein, the term "requested resource access control parameters" refers to one or more access control parameters associated with accessing a requested resource that indicate to a group-based communication server certain users (i.e., user identifiers such as one or more global identifiers) that are authorized to access the requested resource. In some embodiments, the requested resource access control parameters may include one or more email addresses of users who are authorized to access the requested resource. In one embodiment, the requested resource access control parameters may define access controls such as write access, read access, comment access, download access, and the like. In another embodiment, the requested resource access control parameters may include one or more top level domains that, when accessed, authorize a user by generating an email with the same top level domain access to the requested resource. For example, a requested resource access control parameters may include credentials, data, instructions, and the like that are sufficient to authorize all users with email addresses that end in @ACME.com to access an ACME employee registry hosted at a particular URL. This would broadly give access to any user having an email address issued by ACME Corporation. In another embodiment, the requested resource access control parameters may include credentials, data, instructions, and the like that are sufficient to authorize resource access based on engagement of an access link. The term "access link" refers to a hyperlink or URL through which a user, via a client device, may gain authorized access to a requested resource. The requested resource access control parameters are generally governed by resource providers, which typically includes entities other than the group-based communication system provider.

As used herein, the term "group-based communication channel access control parameters" refers to one or more credentials, instructions, files, tokens, or other data that indicates to a group-based communication server which users of the group-based communication system may have access to a group-based communication channel. In one embodiment, the group-based communication channel access control parameters may indicate to a group-based communication server one or more group identifiers that identify one or more groups authorized to comment, view, download and/or edit messaging communications configured for display in the group-based communication channel. In another embodiment, the group-based communication channel access control parameters may indicate to a group-based communication server one or more global identifiers that identify one or more users authorized to access the group-based communication channel.

As used herein, "messaging communication information" or "messaging communication metadata" refers to any information associated with a messaging communication, such a sending user identifier indicating the user who created the messaging communication; group-based communication channel identifier indicating an associated group-based communication channel; the time and date (i.e., a timestamp) that the messaging communication (i.e., the digital messaging object) was first provided to a group-based communication server; urgent indicator; a has file indicator that indicates whether a messaging communication contains a resource request; a word count indicator that indicates the number of words contained in the messaging communication; a message topic indicator that indicates the topic of the messaging communication stemming from the messaging communication (e.g., date and time the channel was made or last received a messaging communication, etc.), and any other information related to the messaging communication that is either discussed herein or apparent to one of ordinary skill in the art in view of this disclosure.

The term "global identifier" refers to one or more items of data by which a user or user's client device may be uniquely identified across the group-based communication system. In embodiments where the group-based communication system spans multiple organizations the global identifier is unique across multiple organizations. The global identifier is a 64 bit unsigned integer or a base34 encoded string that uniquely identifies a user.

The term "non-allowed global identifiers" refers to one or more global identifiers that are authorized to access a group-based communication channel but are not authorized to access a requested resource (based on requested resource access control parameters) indicated in a messaging communication configured for display within the group-based communication channel.

The term "change request prompt object" refers to a data object that when received by a client device and rendered by the client device displays to a group-based communication channel associated with a group-based messaging communication a requested resource access control parameter change interface (defined below) that is configured to prompt a user to change access control parameters associated with a requested resource. The change request prompt object may comprise a group-based communication channel identifier and a requested resource identifier.

The term "requested resource identifier" refers to one or more items of data by which a requested resource may be identified. For example, a requested resource identifier may comprise ASCII text, a pointer, a memory address, and the like.

The term "requested resource access control parameters change interface" refers to an interface rendered by a client device within a group-based communication channel in response to the client device receiving the change request prompt object from the group-based communication server. The requested resource access control parameters change interface displays a requested resource identification portion and a change option selection interface.

The term "change option selection interface" refers to an interface rendered by a client device as part of the requested resource access control parameters change interface. The change option selection interface may comprise one or more actuators that, when engaged by a user of the client device, generate instructions for changing one or more requested resource access control parameters. Such instructions may be sent from the client device to the group-based communication server as a change object selection indication (defined below).

The term "requested resource identification portion" refers to a visual indication of a requested resource within the requested resource access control parameters change interface. Such a visual indication may be simple text of ordinary words.

The term "change option selection indication" refers to a data object that is generated by a client device in response to user engagement, via the client device, of the change option selection interface. Such user engagement may include selection of one available option made available to the user by the change option selection interface. For example, in an embodiment where the change option selection interface comprises of one or more actuators, the change option selection indication is generated based on user selection of one of the actuators. Once generated, the change option selection indication is transmitted to the group-based communication server.

The term "requested resource access control parameters change object" refers to one or more data objects that are transmitted from a group-based communication server to a resource address associated with a requested resource that indicate a request to change one or more requested resource access control parameters. The requested resource access control parameters change object is generated by the group-based communication server in response to receiving a change option selection indication from a client device. Notably, the requested resource access control parameters change object may reference credentials, protocols, and/or change instructions that are specified by, or unique to, a requested resource.

The term "access link object" refers to a data object that allows a client device to display an authorized resource interface for an associated requested resource. The access link object is created by a client device and transmitted to the group-based communication server in response to the group-based communication server sending the client device a requested resource access control parameters change object. Once received by the group-based communication server, the access link object may be transmitted to one or more additional client devices to enable those additional client devices to generate an authorized resource interface that allows authorized access to an associated requested resource.

As used herein, "defined display window" is a defined area within a GUI (graphical user interface) displayed on a client device where information is displayed. A "a group-based communication channel list pane" is a display pane configured to display lists of group-based communication channels that are configured to indicate when new messaging communications are received in the respective group-based communication channels. The group-based communication channel list pane may include actuators for initiating requests to view selected group-based communication channels. The group-based communication channel list pane may include additional information, such as messaging communications, notifications, the name of the group, name of the particular member viewing the interface, etc. A "group-based communication channel communication pane" is a display pane that is configured to display a summary of group-based communication channels that a user profile associated with a client device is a member of. The group-based communication channel communication pane typically includes at least a portion of one or more communication messages. The group-based communication channel communication pane may also display various notifications, actuators, and indicators/indications.

Example System Architecture

Methods, apparatuses, and computer program products of the present disclosure may be embodied by any of a variety of devices. For example, the method, apparatus, and computer program product of an example embodiment may be embodied by a networked device such as a server or other network entity, configured to communicate with one or more devices, such as one or more client devices and/or requested resources. Additionally or alternatively, the computing device may include fixed computing devices, such as a personal computer or a computer workstation. Still further, example embodiments may be embodied by any of a variety of mobile devices, such as a mobile telephone, smartphone, portable digital assistant (PDA), laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 comprises a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system 105. In some embodiments, the protocol is a custom protocol of JSON objects sent via a Web socket channel. In some embodiments, the protocol is JSON over RPC, JSON over REST/HTTP, and the like.

The group-based communication server 106 may be embodied as a computer or computers as known in the art. The group-based communication server 106 operates as a security apparatus and an access credentialing service for the group-based communication system 105. The group-based communication server 106 may provide for receiving of electronic data from various sources, including but not necessarily limited to, the client devices 101A-101N. For example, the group-based communication server 106 may be operable to receive and post or transmit group-based messaging communications provided by the client devices 101A-101N. Group-based communication server 106 may also communicate with resource locations 102A-102N. Resource locations 102A-102N represent databases or other data repositories that host requested resources, which may be accessed at respective resource addresses. In the depicted embodiment, resource locations 102A-102N are external and remote to group-based communication system 105 but are disposed in communication with the group-based communication system 105 through the network 104. The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of group-based messaging communications organized among a plurality of group-based communication channels, and/or the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a messaging communication may be sent from a client device 101A-101N to a group-based communication system 105. In various implementations, the messaging communication may be sent to the group-based communication system 105 over communications network 104 directly by a client device 101A-101N, the messaging communication may be sent to the group-based communication system 105 via an intermediary such as a message server, and/or the like.

In one implementation, the messaging communication may include messaging communication information such as sending user identifier, a group identifier, a group-based communication channel identifier, attachments (e.g., files), message hierarchy data (e.g., the messaging communication may be a reply to another messaging communication), third party metadata, and/or the like. In one embodiment, the client device 101A-101N may provide the following example messaging communication, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
```

-continued

```
        <timestamp>2020-12-31 23:59:59</timestamp>
        <user_accounts_details>
            <user_account_credentials>
                <user_name>ID_user_1 </user_name>
                <password>abc123</password>
                //OPTIONAL <cookie>cookieID</cookie>
                //OPTIONAL<digital_cert_link>www.mydigitalcertificate.com/
JohnDoeDaDoeDoe@gmail.com/mycertifcate.dc</digital_cert_link>
                //OPTIONAL<digital_certificate>_DATA _</digital_certificate>
            </user_account_credentials>
        </user_accounts_details>
        <client_details> //iOS Client with App and Webkit
                //it should be noted that although several client details
                //sections are provided to show example variants of client
                //sources, further messages will include only on to save
                //space
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/1 1D201
Safari/9537.53 </user_ agent_ string>
                <client _product_ type>iPhone6,1</client_product_type>
                <client_serial_number>DNXXX1X1XXXX</client_serial_number>
        <client_UDID>3XXXXXXXXXXXXXXXXXXXXXXXXD</client_UDID>
                <client_OS>iOS</client_OS>
                <client_OS_version>7.1.1 </client_OS_version>
                <client_app_type>app with webkit</client_app_type>
                <app_installed_flag>true</app_installed_flag>
                <app_name> </app_name>
                <app_version>1.0</app_version>
                <app_webkit_name>Mobile Safari</client_webkit_name>
                <client_version>537.51.2</client_version>
        </client_details>
        <client_details> //iOS Client with Webbrowser
                <client_IP>10.0.0.123</client_IP>
                <user_agent_string>Mozilla/5.0 (iPhone; CPU iPhone OS 7_1_1 like
Mac OS X) AppleWebKit/537.51.2 (KHTML, like Gecko) Version/7.0 Mobile/11D201
Safari/9537.53</user_agent_string>
                <client_product_type>iPhone6, 1</client_product_type>
                <client_serial_number>DNXXX1X1XXXX</client_serial_number>
        <client_UDID>3XXXXXXXXXXXXXXXXXXXXXXXXD</client_UDID>
                <client_OS>iOS</client_OS>
                <client_OS_version>7.1.1</client_OS_version>
                <client_app_type>web browser</ client_app_type>
                <client_name>Mobile Safari</client_name>
                <client_version>9537.53</client_version>
        </client_details>
        <client_details> //Android Client with Webbrowser
                <client_IP>10.0.0.123</client_IP>
                <user_agent_string>Mozilla/5.0 (Linux; U; Android 4.0.4; en-us;
Nexus S Build/IMM76D) AppleWebKit/534.30 (KHTML, like Gecko) Version/4.0
Mobile Safari/534.30</user_agent_string>
                <client_product_type>Nexus S</client_product_type>
                <client_serial_number>YXXXXXXXXZ</client_serial_number>
                <client_UDID>FXXXXXXXXX-XXXX-XXXX-
XXXXXXXXXXXXXXXXX</client_UDID>
                <client_OS>Android</client_OS>
                <client_OS_version>4.0.4</client_OS_version>
                <client_app_type>web browser</client_app_type>
                <client_name>Mobile Safari</client_name>
                <client_version>534.30</client_version>
        </client_details>
        <client_details> //Mac Desktop with Web browser
                <client_IP>10.0.0.123</client_IP>
                <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
                <client_product_type>MacPro5, 1</client_product_type>
                <client_serial_number>YXXXXXXXXZ</client_serial_number>
                <client_UDID>FXXXXXXXXX-XXXX-XXXX-
XXXXXXXXXXXXXXXXX</client_UDID>
                <client_OS>Mac OS X</client_OS>
                <client_OS_version>10.9.3</client_OS_version>
                <client_app_type>web browser</client_app_type>
                <client_name>Mobile Safari</client_name>
                <client_version>537.75.14</client_version>
        </client_details>
        <message>
                <message_identifier> ID_message_10</message_identifier>
                <team_identifier>ID_team_1</team_identifier>
```

```
            <channel_identifier>ID_channel_1</channel_identifier>
            <contents>That is an interesting disclosure. I have attached a copy
our patent policy.</contents>
            <attachments>patent_policy.pdf</attachments>
        </message>
</auth_request>
```

The group-based communication system 105 comprises at least one group-based communication server 106 that may create a storage message based upon the received messaging communication to facilitate message indexing and storage in a group-based communication repository 107. In one implementation, the storage message may include the messaging communication as well as messaging communication information such as a message identifier, a group identifier, a group-based communication channel identifier, a sending user identifier, topics, responses, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST/storage_message.php HTTP/1.1
Host: www.server.com
Content-Type: Application/XML
Content-Length: 667
<?XML version="1.0" encoding="UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting disclosure. I have
        attached a copy our patent policy.</contents>
    <attachments>patent_policy.pdf</attachments>
    <conversation_primitive>
        conversation includes messages: ID_message_8,
            ID_message_9, ID_message_10,
            ID_message_11, ID_message_12
    </conversation_primitive>
</storage_message>
```

In embodiments, a group identifier as defined above may be associated with the messaging communication. This group identifier may be used by the group-based communication system 105 to allocate the messaging communication to the appropriate group-based communication interface.

In embodiments, messaging communication information such as a sending user identifier as defined above may be associated with the messaging communication. In one implementation, the messaging communication may be parsed (e.g., using PHP commands) to determine a sending user identifier of the user who sent the messaging communication.

In embodiments, messaging communication information such as topics may be associated with the messaging communication. In one implementation, the message contents may be parsed (e.g., using PHP commands) to determine topics discussed in the messaging communication. For example, hashtags in the messaging communication may indicate to group-based communication server 106 topics associated with the messaging communication. In another example, the messaging communication may be analyzed (e.g., by itself, with other messaging communications in a conversation primitive) or parsed using a machine learning technique, such as topic modeling, to determine topics associated with the messaging communication.

In embodiments, data indicating responses may be associated with the messaging communication as further messaging communication information. For example, responses to the messaging communication by other users may include reactions (e.g., selection of an emoji associated with the messaging communication, selection of a "like" button associated with the messaging communication), clicking on a hyperlink embedded in the messaging communication, replying to the messaging communication (e.g., posting a message to the group-based communication channel in response to the messaging communication), downloading a file associated with the messaging communication, sharing the message from one group-based communication channel to another group-based communication channel, pinning the messaging communication, starring the messaging communication, and/or the like. In one implementation, data regarding responses to the messaging communication by other users may be included with the messaging communication, and the messaging communication may be parsed (e.g., using PHP commands) to determine the responses. In another implementation, data regarding responses to the messaging communication may be retrieved from a database as further messaging communication information. For example, data regarding responses to the messaging communication may be retrieved via a MySQL database command similar to the following:

```
SELECT messageResponses
FROM MSM_Message
WHERE messageID=ID_message_10.
```

For example, data regarding responses to the message may be used to determine context for the messaging communication (e.g., a social score for the message from the perspective of some user). In another example, data regarding responses to the messaging communication may be analyzed to determine context regarding the user (e.g., the user's expertise in a topic may be determined based on the responses to the user's messaging communication regarding the topic).

In embodiments, attachments may be included with the message and may act as messaging communication information. If there are attachments, files may be associated with the message. In one implementation, the messaging communication may be parsed (e.g., using PHP commands) to determine file names of the attachments. For example, file contents may be analyzed to determine context for the messaging communication (e.g., a patent policy document may indicate that the messaging communication is associated with the topic "patents").

In embodiments, third party metadata may be associated with the messaging communication and act as messaging communication information. For example, third party metadata may provide additional context regarding the messaging communication or the user that is specific to a company, group, group-based communication interface, group-based communication channel, and/or the like. In one implementation, the messaging communication may be parsed (e.g., using PHP commands) to determine third party metadata. For example, third party metadata may indicate whether the user who sent the messaging communication is an authorized representative of the group-based communication channel (e.g., an authorized representative may be authorized by the company to respond to questions in the group-based communication channel).

In embodiments, a conversation primitive may be associated with the messaging communication and act as an additional piece of messaging communication information. In one implementation, a conversation primitive is an element used to analyze, index, store, and/or the like messaging communications. For example, the messaging communication may be analyzed by itself, and may form its own conversation primitive. In another example, the messaging communication may be analyzed along with other messaging communications that make up a conversation, and the messaging communications that make up the conversation may form a conversation primitive. In one implementation, the conversation primitive may be determined as the messaging communication, a specified number (e.g., two) of preceding messaging communications and a specified number (e.g., two) of following messaging communications. In another implementation, the conversation primitive may be determined based on analysis of topics discussed in the messaging communication and other messaging communications (e.g., in the group-based communication channel) and/or proximity (e.g., message send order proximity, message send time proximity) of these messaging communications.

In embodiments, various messaging communication information, determined as described above, and/or the contents of the messaging communication may be used to index the messaging communication (e.g., using the conversation primitive) to facilitate various facets of searching (i.e., search queries that return results from group-based communication repository 107). In one implementation, a storage message may be sent from group-based communication, server 106 to facilitate indexing in group-based communication repository 107. In another implementation, messaging communication information associated with the messaging communication may be determined and the messaging communication may be indexed in group-based communication repository 107. In one embodiment, the messaging communication may be indexed such that a company's or a group's messaging communications are indexed separately (e.g., in a separate index associated with the group and/or company that is not shared with other groups and/or companies). In one implementation, messaging communications may be indexed at a separate distributed repository (e.g., to facilitate data isolation for security purposes).

If there are attachments associated with the messaging communication, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations described above with respect to FIG. 1 and below with respect to FIGS. 3-9. Although these components 107 and 201-205 are described with respect to functional limitations, it should be understood that the particular implementations necessarily include the use of particular hardware. It should also be understood that certain of these components 107 and 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or nonvolatile memories. In other words, for example, the memory may be an electronic storage device (e.g., a computer readable storage medium). The memory 201 may be configured to store information, data, digital messaging objects, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. Processor 202 and/or user interface circuitry comprising processor 202 may be configured to control one or more functions of one or more user interface elements through computer program instructions (e.g., software and/or firmware) stored on a memory accessible to processor 202 (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Group-Based Communication Repository

Now with reference to FIGS. 3A and 3B, group-based communication repository 107 comprises identifier database 302. Each user of group-based communication system 105 has identification information stored in the identifier database 302. Each user of group-based communication system 105 may have a database table entry in identifier database 302. In some embodiments, database table 304 includes global identifiers 306, full name values 308, email address values 310, and group identifiers 312. All data in the identifier database 302 is part of a user profile.

Each member of an organization that utilizes group-based communication system 105 is associated with a global identifier. The global identifier is a unique number. In one embodiment, the global identifier may be stored (e.g., within the identifier database 302) as a 64 bit unsigned integer and represented externally (outside of memory) as a base34 encoded string. As a truncated example, the exemplary database table 304 illustrates global identifiers 306 in base34 encoded string form. The global identifier 306 uniquely identifies a single user in the group-based communication system 105. In embodiments where the group-based communication system 105 spans multiple organizations, the global identifier 306 is still only associated with a single user. Whenever a messaging communication is created, corresponding messaging communication information may contain a global identifier as a sending user identifier so that group-based communication server 106 may determine the originator of the messaging communication.

Full name value 308 is a value that indicates a user's full name. As shown in FIG. 3B the global identifier WI2345678 is associated with a user whose full name is Mary James. Although full name value 308 is shown as a string it is possible to store the full name value in another form such as an integer, symbol, or character. This alternate storage method may be useful when the user's full name may include non ASCII characters, symbols, or various foreign characters. Regardless of how the full name value 308 is stored, it is rendered for display, on a client device, as a human readable string.

Email address value 310 is a value that indicates a user's email address. As shown in FIG. 3B the global identifier WI2345678 is associated with a user whose full name is Mary James and has email addresses of maryj@acme.com and maryj@gmail.com. The email address value 310 may include personal as well as professional email addresses.

Group identifier 312 is a value that indicates to group-based communication server 106 which groups a user belongs to. Unlike the global identifier, a user is associated with a different group identifier for each group they are a member of In reference to David Le in FIG. 3B, David has one group identifier for the domestic sales group. In contrast, Mary James has two distinct group identifiers. Mary is a member of ACME Corporation's mobile team and has a mobile group identifier. Mary is a member of ACME Corporation's security team and has a security group identifier. When group-based communication system 105 is used for multiple organizations, the group identifier value will include an identifier that identifies the organization which the groups belong to. Group identifiers may also exists within group-based communication channel access control parameters to indicate to group-based communication server 106 which groups of users are authorized certain actions within a group-based communication channel.

A user status value may also be included (not shown) in database table 304. A user status value is included in a user profile and refers to one or more items of data that indicates a user's status within the organization or a group. For example, Mary James may have a user status value of "Security Team Lead." In another embodiment, a user status value may indicate if the user is currently on the phone, in a meeting, on vacation, available, and the like.

A group-based communication channel identifier may also be included (not shown) in database table 304. The group-based communication channel identifier indicates which group-based communication channels each user has joined. Furthermore, different users may have different authorizations within each group-based communication channel and these authorization rights may be indicated in database table 304.

Group-based communication repository 107 may also store messaging communications as well as messaging communication information. Messaging communications as well as corresponding messaging communication information may be indexed within group-based communication repository 107 by various indicators such as a group-based communication channel identifier or global identifier. Group-based communication server 106 may query group-based communication repository using a user's global identifier to find messaging communications and corresponding messaging communication information associated with that user. Group-based communication server 106 may query group-based communication repository using a group-based communication channel identifier to find messaging communications and corresponding messaging communication information associated with a particular group-based communication channel identifier.

Stored messaging communication information may include a timestamp corresponding to a messaging communication, an urgent indicator corresponding to a messaging communication, a has_file indicator corresponding to a messaging communication, a word count indicator corresponding to a messaging communication, a message topic corresponding to a messaging communication. Other messaging communication information may also be included in group-based communication repository 107.

Group-Based Communication Server Communications

FIG. 4A illustrates an exemplary process 400 performed by the group-based communication server 107 (as shown in FIG. 1). The exemplary process 400 involves transmitting and receiving communications to and from a client device 101A, a group-based communication repository 107, and a resource location 102A (each also shown in FIG. 1). Additional details surrounding the exemplary process 400, and alternate embodiments thereof, are illustrated in the process flow diagrams of FIGS. 5 to 7.

In the depicted embodiment, at step 702, client device 101A transmits to group-based communication server 106 a digital messaging object that is configured to be displayed within a particular group-based communication channel. For example, in the depicted embodiment, the client device 101A is running a software application that is configured to render a group-based communication interface as shown as item 420 in FIG. 4B. Group-based communication interface 420 comprises a group-based communication channel list pane 422 that displays one or more group-based communication channels that the user of client device 101A is a member of group-based communication interface 420 further comprises a group-based communication channel communication pane 424 that displays one or more digital messaging objects for a respective group-based communication channel.

The digital messaging object comprises text and a requested resource. For example, in the depicted embodiment, a user of client device 101A enters "Hey Guys, check out this link" into box 426, wherein the "link" is a URL. In response to the user of client device 101A selecting "send", client device 101A will form a digital messaging object containing "Hey Guys, check out this link." This digital messaging object is part of a messaging communication. Client device 101 will additionally generate messaging communication information associated with the digital messaging object such as a sending user identifier, group-based communication channel identifier, timestamp, urgent indicator, has file indicator, word count indicator, or message topic indicator. For example, in the depicted embodiment, any text submitted to client device 101A via box 426 is for display within the "#things-to-know" group-based communication channel as shown in FIG. 4B. Client device 101A may then identify a corresponding group-based communication channel identifier for the "#things-to-know" group-based communication channel and include it in messaging communication information. Client device 101A will then send the digital messaging object and messaging communication information to group-based communication server 106. Step 402 is further detailed by step 502 in FIG. 5.

At step 404, group-based communication server 106 transmits a request to resource location 102A for resource location 102A to send requested resource access control parameters associated with the previously received requested resource (at stop 402.) Group-based communication server 106 may determine a resource location 102A for a corresponding requested resource by parsing the previously received requested resource. For example, a resource requested in the form of a URL "http://logo.ACME.com" indicates to group-based communication server 106 a request for the "logo" of "ACME." From this information, group-based communication server 106 can identify ACME-.com as resource location 102A and subsequently send the request. Step 404 is further detailed by step 504 in FIG. 5.

At step 406, group-based communication server 106 queries group-based communication repository 107 to retrieve group-based communication channel access control parameters. Group-based communication server 106 may use a previously received group-based communication channel identifier (i.e., received at step 402) to query group-based communication repository 107 to find group-based communication channel access control parameters for the identified group-based communication channel. Step 406 is further detailed by step 506 in FIG. 5.

At step 408, group-based communication server 106, based on the retrieved requested resource access control parameters and the retrieved group-based communication channel access control parameters, determines a list of non-allowed global identifiers corresponding to members of the previously identified group-based communication channel that are not allowed to access the requested resource. For example, the retrieved requested resource access control parameters may indicate a first set of email addresses that are associated with users that are authorized to download or otherwise access a requested resource and the retrieved group-based communication channel access control parameters may indicate a second set of email addresses that are associated with users that are authorized to download messaging communications in the group-based communication channel. Group-based communication server 106 may compare the first set of email addresses and the second set of email addresses to determine email addresses and/or global identifiers associated with channel members that are authorized to download messaging communications in the group-based communication channel, but which are not authorized to download the requested resource. Step 408 is further detailed by step 508 in FIG. 5.

At step 410, group-based communication server 106, generates and sends client device 101A a data object that when rendered by client device 101A displays to a group-based communication channel associated with the previously sent messaging communication a requested resource access control parameter change interface. The requested resource access control parameter change interface is configured to prompt a user to change access control parameters associated with the requested resource. For example, FIG. 8A illustrates an example requested resource access control parameters change interface 800. The depicted requested resource access control parameters change interface 800 includes a change option selection interface 810 that is discussed in greater detail below. Step 410 is further detailed by step 702 in FIG. 7.

At step 412, client device 101A transmits to group-based communication server 106 a data object that is generated by client device 101A in response to user engagement, via a client device 101A, of a change option selection interface. As shown in FIG. 8B, the requested resource access control parameter change interface 800 includes a change option selection interface 810. Change option selection interface 810 is an interface rendered by client device 101A that comprises of one or more actuators that, when engaged by a user of the client device, generates instructions for changing one or more group-based communication access control parameters. In the depicted embodiment, the actuator is a drop down menu configured to allow selection of a change option. The instructions for changing one or more group-based communication access control parameters are sent from the client device to group-based communication server 106 as a change object selection indication. Step 412 is further detailed by steps 704-706 in FIG. 7.

At step 414, group-based communication server 106, determines a previously integrated third-party application program interface (API) related to the requested resource in order to send a request resource access control parameters change object to resource location 102A. The previously integrated third-party API contains communication protocols, credentials, and/or change authorizations that authorize group-based communication server 106 to change the requested resource access control parameters. Step 414 is further detailed by step 708 in FIG. 7.

At step 418, group-based communication server, transmits to resource location 102A a data object associated with a requested resource that indicates a request to change one or more requested resource access control parameters. Step 418 is further detailed by step 710 in FIG. 7.

FIG. 5 illustrates exemplary process 500 performed by a group-based communication server within a group-based communication system. At step 502, group-based communication server 106 receives, from a client device, a group-based messaging communication and associated group-based messaging communication information. The group-based messaging communication information may include a group-based messaging communication channel identifier, a resource request, and a sending user identifier. The group-based messaging communication channel identifier indicates to group-based communication server 106 which channel the group-based messaging communication is configured for display within. Group-based communication system 105 contains a plurality of group-based communication channels that enable authorized groups of users to communicate with each other.

For each established group-based communication channel, group-based communication server 106 creates a memory storage location within group-based communication repository 107. This memory storage location may store all group-based messaging communications (and associated group-based messaging communication information) that are configured for display within the group-based communication channel. The memory storage location may be indexed by a corresponding group-based communication channel identifier. This way, group-based communication server 106 may simply query group-based communication repository 107 using a group-based communication channel identifier in order to locate, store, and/or retrieve group-based messaging communications that are configured for display within that group-based communication channel.

A resource request identifies a resource and a corresponding resource address. A requested resource may be external (i.e., stored to a database outside of the group-based communication system or any local area network associated with the same) to group-based communication system 105 and may be controlled by a third-party. The resource address details the network location of the requested resource. For example, a resource may be a word document entitled "Dave's Project Plans" stored on Google Drive®. To request this resource, a user, via a client device, may include in a group-based messaging communication the URL https://docs.google.com/document/d/1_vtKtUcXgTUYjb-iFVgtQ4kS8emzwWh-hNle2V3XCY/. This URL represents the resource address, which gives the location of the resource ("Dave's Project Plans" document). In some embodiments, when a resource request is included in a group-based messaging communication, the sending client device may indicate, in metadata associated with the group-based messaging communication, a resource request exists in the group-based messaging communication. In other embodiments, group-based communication server 106 may parse a received group-based messaging communication and determine one or more embedded resource requests. In such an embodiment, group-based communication server 106 may treat any received URL within a group-based messaging communication as a resource request.

In some embodiments, group-based communication server 106 may receive a request, with a resource location identifier, from a client device to include a file or a link to a file within a messaging communication and in response, group-based communication server 106 may send to the client device a renderable file picker object that when rendered by the client device displays to a user of the client device a list of files associated with the user and a resource location associated with the received resource location identifier. The renderable file picker object when rendered by the client device may display the list of files associated with the user in a folder hierarchy form. In some embodiments, a resource request may be for a resource that is internal (i.e., stored to a database within a local area network) to group-based communication system 105.

The group-based messaging communication information may further include a sending user identifier that identifies the creator of the group-based messaging communication. In one embodiment, the sending user identifier is a user's global identifier, as the global identifier uniquely identifies a user within group-based communication system 105.

At step 504, group-based communication server 106 determines requested resource access control parameters for the requested resource in the group-based messaging communication received at step 502. Resources often are stored or originate outside of group-based communication system 105 and their access control parameters may be governed by third party systems (i.e., systems other than the group-based communication system). For example, a resource may be in located in Google Drive®, Dropbox®, iCloud®, or other cloud-based storage services. These services are external to group-based communication system 105 and group-based communication system 105 may not be able to modify access control parameters for resource's controlled by these services without permission or without using a previously integrated APL Group-based communication server 106 may query the resource location associated with a requested resource to determine access control parameters for the requested resource.

In one embodiment, requested resource access control parameters may specify to group-based communication server 106 certain users that are authorized to access the resource. For example, requested resource access control parameters for the document "Dave's Project Plans" on Google Drive® may only authorize access to dle33@gmail.com, mmblook@gmail.com and shellybelly@gmail.com. This means that only users associated with one of those three email addresses are authorized to access the document. Although this example uses email addresses, any other unique identifier may be used.

In another embodiment, requested resource access control parameters for the document "Dave's Project Plans" on Google Drive® may detail authorized access by top level domain. For example, anyone with an email address that has the top level domain of @acme.com may be authorized to access the document. This type of access control parameter is useful when a user wishes to make a resource available to everyone within an organization or group. Regardless of the access control parameters of the resource, group-based communication server 106 will retrieve them.

At step 506, group-based communication server 106 determines group-based communication channel access control parameters associated with the group-based communication channel identified according to the group-based communication channel identifier from step 502. Group-based communication channels are collaborative environments inside group-based communication system 105. The creator of a group-based communication channel sets group-based communication channel access control parameters to indicate to group-based communication server 106 one or more groups of users that are authorized to access the group-based communication channel. For example, if Mary James (FIG. 3B) creates, via a client device, a group-based communication channel entitled "Security w/I&D Sales," Mary sets group-based communication channel access control parameters, via a client device, to indicate to group-based communication server 106 that only members of the security, international sales, and domestic sales groups are authorized to access the "Security w/I&D Sales" channel. Group-based communication server 106 then determines a group-based communication channel identifier for the group-based communication channel such as securitywidsales. Group-based communication server 106 will then index all group-based messaging communications, associated group-based messaging communication information, and access control parameters for the "Security w/I&D Sales" channel by the group-based communication channel identifier securitywidsales inside group-based communication repository 107. In addition, group-based communication server 106 will store group ids "security," "domestic sales," and "international sales" as part of the access control parameters for the "Security w/I&D Sales" channel. Group-based communication server 106 is then able to easily access all messaging communications and access control parameters for each group-based communication channel by using a group-based communication channel identifier.

At step 508, group-based communication server 106 determines a list of non-allowed global identifiers based on the retrieved group-based communication access control parameters and the retrieved requested resource access control parameters. Whenever a resource request is part of a group-based messaging communication, group-based communication server 106 needs to determine if all members of the corresponding group-based communication channel are authorized to access the resource address associated with the requested resource. A list of nonallowed global identifiers will indicate to group-based communication server 106 one or more members of the group-based communication channel that are not currently authorized to access the resource address associated with the requested resource. The steps taken in 508 are described in more detail in process 600 as illustrated in in FIG. 6.

If the list of non-allowed global identifiers contains no entries then process 500 moves to step 510. If the list of non-allowed global identifiers contains one or more entries, then process 500 moves to step 512, which is described in more detail by process 700 as illustrated in FIG. 7.

At step 510, group-based communication server 106 transmits, to the client device that sent the messaging communications in step 502, a notification indicating that every member of the group-based communication channel is authorized to access the requested resource. An example of the notification, when displayed by a client device, is shown as item 816 in FIG. 8C. In other embodiments, the notification may not be displayed to the client device.

FIG. 6 illustrates exemplary process 600 performed by a group-based communication server to determine a list of non-allowed global identifiers for a requested resource. Group-based communication server 106 generates the list of non-allowed global identifiers to determine one or more members of a group-based communication channel that are not authorized to access a requested resource within a group-based communication channel. At step 602, group-based communication server 106 determines one or more authorized group identifiers for the group-based communication channel. The depicted process is the same as described in step 506 of process 500.

At step 604, group-based communication server 106 queries group-based communication repository 107 to determine one or more global identifiers associated with user profile data that comprises an authorized group identifier. Group-based communication server 106 may query identifier database 302 using the one or more authorized group identifiers to determine one or more user profiles that contain the one more authorized group identifiers. For example, the group-based communication channel access control parameters of the "Security w/I&D Sales" channel indicate to group-based communication 106 that users associated with user profiles that contain a security, domestic sales, or international sales group identifier are authorized to access the channel. These identified group identifiers are considered authorized group identifiers.

Group-based communication server 106 queries identifier database 302 to find user profiles that respectively contain one of the authorized group identifiers. Using data table 304 in FIG. 3B, for example, group-based communication server 106's query would return user profiles associated with users Mary James, Walter White, and David Le. As previously described, each user profile contains a unique global identifier for a user. Thus, once group-based communication server 106 determines the proper user profiles it may also, by virtue of accessing the user profile, obtain a corresponding global identifier for that user profile.

At step 606, group-based communication server 106 determines an email address corresponding to each global identifier associated with an authorized group identifier. As described in step 604 and shown in FIG. 3B, user profile data may include a global identifier, group identifiers, and email addresses. Thus, when group-based communication server 106 accesses user profiles in step 604 to obtain user profiles associated with authorized group identifiers, group-based communication server I 06 may also obtain the email addresses associated with those global identifiers. It is important to note that a user profile may contain multiple email addresses associated with a single global identifier and group-based communication server I 06 obtains all email addresses associated with an identified user profile. From user profile data, group-based communication server 106 may create a channel-based global identifier email table and store this table in at least temporary internal memory. Table I below illustrates a sample channel-based global identifier email table based on the previous example.

TABLE 1

| Global Identifier | Email Addresses |
|---|---|
| W12345678 | maryj@acme.com; maryj@gmail.com |
| W22222222 | waltw@acme.com |
| W33333333 | dle33@gmail.com |

By creating the channel-based global identifier email table, group-based communication server 106 will not have to constantly query group-based communication repository 107 for user profile data. Furthermore, it is far less computationally expensive to store a channel-based global identifier email table in temporary memory instead of storing full user profiles in temporary memory.

At step 608, group-based communication server I 06 compares the retrieved email addresses with the requested resource access control parameters to determine the list of nonallowed global identifiers. Group-based communication server I 06 compares the email addresses in the generated channel-based global identifier email table to email addresses or top domain levels that are indicated as authorized in requested resource access control parameters. If the requested resource access control parameters specify certain email addresses that are authorized to access a corresponding resource address, then group-based communication server I 06 will compare each of those email addresses to email addresses in the channel-based global identifier email table to determine which global identifiers are not authorized to access the requested resource.

For example, a messaging communication may be "Hey Everyone, please check out the file at https://docs.google-.com/document/d/1_vtKtUcXgTUYjb-iFVgtQ4kS8emzwWhhNle2V3X-CY/." However, the requested resource access parameters for the document "Dave's Project Plans" on Google Drive® may only authorize access to davidj@gmail.com, mmblook@gmail.com, and shellybelly@gmail.com. Thus, group-based communication server 106, using the channel-based global identifier email table generated at step 606, would indicate that global identifiers WI2345678 and W22222222 are not authorized to access the requested resource because maryj@acme.com, maryj@gmail.com, and waltw@acme.com are authorized to access the word document according to the requested resource access control parameters. Group-based communication server 106 would then add global identifiers WI2345678 and W22222222 to the list of non-allowed global identifiers.

If the requested resource access control parameters specify a top level domain, then group-based communication server 106 will compare each of email addresses in the channel-based global identifier email table to the authorized top domain level. For example, a messaging communication may be "Hey Everyone, please check out the file at https://docs.google.com/document/d/1_vtKtUcXgTUYjb-iFVgtQ4kS8emzwWh-hNle2V3XCY/." However, access control parameters for the word document "Dave's Project Plans" on Google Drive® may only authorize access to the top leveldomain@acme.com. Thus, group-based communication 106, using the channel-based global identifier email table generated in step 606, would indicate that global identifier W33333333 is not authorized to access because dle33@gmail.com does not belong to the top level domain of @acme.com. Group-based communication server 106 would then add global identifier W33333333 to the list of nonallowed global identifiers.

FIG. 7 illustrates exemplary process 700 performed by a group-based communication server in circumstances when there are one or more entries in the list of non-allowed global identifiers and an API, widget, plug-in, software, etc., related to a requested resource has previously been integrated into group-based communication system 105. As previously indicated, group-based communication system 105 is capable of supporting several external applications and clients. For example, group-based communication system 105 may integrate (using one or more custom or provided APIs) GitHub®, In Vision App®, Jira Cloud®, Twitter®, Giphy®, Google® products, Microsoft OneDrive®, and the like. When an application or client is integrated into group-based communication system 105, group-based communication system server 106 may directly implement functions specific to the integrated application or client. One such function may be altering one or more requested resource access control parameters of resources provided by an integrated application or client. Process 700 describes a process for modifying one or more access control parameters using integrated application functionality.

An external application or client may be integrated into group-based communication system 105 by using OAuth (or a similar framework.) Group-based communication channels within group-based communication system 105 may have one or more external applications installed. Using OAuth allows the user of a client device, to authorize an external application to access a user's account associated with a requested resource. The user may set the external application's authorization with regard to the user's account associated with the requested resource to any acceptable scope (e.g., write, read.) Once the external application's authorization is set, then the external application may, for example, read the user's account associated with the requested resource to determine one or more authentication parameters associated with the user. Group-based communication server 106 is then able to, via the external application, use these retrieved authentication parameters to authenticate to a requested resource as the user of the client device, and subsequently alter the requested resource access control parameters. Thus, by using OAuth, an external application may be integrated with group-based communication system 105.

At step 702, group-based communication server 106 transmits, to the client device that sent the messaging communication at step 502, a change request prompt object. The change request prompt object may include a group-based communication channel identifier and a requested resource identifier. The client device renders the received request prompt object to display a requested resource access control parameters change interface that displays various options for changing the requested resource access control parameters. An example requested resource access control parameters change interface is illustrated in FIGS. 8A and 8B.

Now with reference to FIGS. 8A and 8B, an exemplary requested resource access control parameters change interface 800 is shown. Requested resource access control parameters change interface 800 is displayed in response to a client device receiving and rendering a change request prompt object. Requested resource access control parameters change interface 800 includes request status 802, requested resource service provider indicator 804, message 806, requested resource portion 808, and change option selection interface 810. The request status 802 identifies which members of a group-based communication channel may render the change request prompt object. Requested resource service provider indicator 804 indicates a requested resource service provider. In the depicted embodiment, requested resource service provided indictor 804 indicates "XYZ" which indicates the requested resource is an XYZ application. In another example, requested resource service provided indicator 804 may be "Google Drive" which indicates that the requested resource is a Google Drive® file. Message 806 is text that indicates that a particular requested resource, which is identified by requested resource portion 808, is not accessible by every member of a corresponding group-based communication channel. Requested resource portion 808 is a plain text version of a received requested resource identifier. For example, the requested resource identifier in the received change request prompt object may be https://docs.google.com/document/d/1_vtKtUcXgTUYjb-iFVgtQ4kS8emzwWh-hNle2V3 XCY/." The URL identifies the word document "Dave's Project Plans." However, to make requested resource access control parameters change interface 800 easily discernable by a user, the client device may simply refer to the requested resource identifier by the a requested resource portion text of "Dave's Project Plan." This allows the user of the client device to easily identify the requested resource. Change option selection interface 810, when engaged by a user, via a client device, displays one or more actuators (e.g., links, widgets, drop down menus, etc.) that when engaged by the user, via the client device, generate instructions for changing one or more requested resource access control parameters. A user my engage the change option selection interface 810 and its actuators by various known means such as a touch-screen, mouse click and the like.

When a user engages change option selection interface 810, requested resource access control parameters change interface 800 displays an expanded change option selection interface 810, as shown in FIG. 8B. The expanded change option selection interface 810, here a drop down menu, details one or more options to change the requested resources access control parameters. Each one of the displayed options is an actuator that when engaged (i.e., clicked) initiates a certain action from the client device. Whenever a user engages any one of the one or more options, the client device will generate a change option selection indication, which is a data object that indicates the selection of the user. This change option selection indication is subsequently transmitted to group-based communication server 106.

In one embodiment, a user of a client device may engage an option under the "Share to anyone with the link" heading and the client device will subsequently send a change option selection indication with an access link object to group-based communication server 106. When a user engages an option under the "Share to anyone with the link" heading it indicates to a client device that the user wishes to supply, via the client device, an access link object to members of the group-based communication channel. The access link object, when rendered by another client device, displays an authorized resource interface for an associated requested resource. In another embodiment, a user of a client device may engage an option under the "Share directly with the recipient" heading and the client device will subsequently generate a change option selection indication indicating the user's selection to group-based communication server 106. The options under the "Share directly with recipient" heading may be referred to as selectable automatic modify actuators which when selected cause the client device to indicate to group-based. communication server to transmit a requested resource access control parameter change object to a resource address associated with a requested resource. These automatic modify actuators enable group-based communication server 106 to automatically change the requested resource access control parameters without additional user or client device action.

At step 704, group-based communication server 106 receives, from the client device that sent the messaging communication at step 502, an access link object as part of the received change option selection indication. An access link object may be a renderable data object that when rendered by a client device renders an authorized resource interface that allows authorized access to an associated requested resource. For example, a messaging communication may be "Hey Everyone, please check out the file at https://docs.google.com/document/d/1_vtKtUcXgTUYjb-iFVgtQ4kS8emzwWh-hNle2V3XCY/." However, the word document "Dave's Project Plans" on Google Drive® is not authorized to be accessed by all members on the group-based communication channel which the messaging communication is configured for display within. In response, group-based communication server 106 sends, to the client device that transmitted the messaging communication, a change request prompt object stating "Dear user, the resource you have shared cannot be accessed by all the members of this group-based communication channel. Please change the access control parameters of the resource. Thank You." In response, the client device may send to group-based communication server 106 an access link object such as that includes the URL https://docs.google.com/document/d/1_vtKtUcXgTUYjb-iFVgtQ4kS8emzwWh-hNle2V3XCY/all-access. When a user, via a client device, renders the access link object, the client device will render an authorized resource interface and inside the authorized resource interface the client device accesses the requested resource via the received URL. As a result, members of the group-based communication channel are given authorized access to a requested resource via an access link object.

At step 706, group-based communication server 106 receives, from the client device that sent the messaging communication at step 502, a change option selection indication. The change option selection indication indicates a specific automatic modify actuator selected by a user. A received change option selection indication indicates to group-based communication server 106 that the user wishes to have group-based communication server 106 automatically modify the requested resource access control parameters.

At step 708, group-based communication server 106, in response to receiving the change option selection identification corresponding to a specific selectable automatic modify actuator, determines a previously integrated third-party application program interface related to the requested resource. A previously integrated third-party application program interface is one or more APIs that have been previously established to allow integration between an external application or client and group-based communication system 105. In one embodiment, each group-based communication channel may have different external applications or clients integrated. By establishing usable APIs for external applications a user of a client device may give authorization to group-based communication server 106 modify or change requested resource access control parameters. This functionality prevents the user of a client device from manually having to go to a requested resource and change the requested resource access control parameters. Group-based communication system 105 is capable of handling a vast amount of users and having a user manually change requested resource access control parameters for several hundred or thousand users would be tedious.

For example, Mary James (FIG. 3B) creates, via a client device, a group-based communication channel entitled "Security w/I&D Sales." Mary then decides she wants this channel to be integrated with Microsoft OneDrive® and Jira Cloud® so that files stored with either cloud-based service may be accessible and controllable by group-based communication server 106. Group-based communications server 106, via one or more APIs, integrates the functionality of both cloud-based services into the "Security w/I&D Sales" channel. Now whenever a resource associated with Microsoft OneDrive® or Jira Cloud® appears in the "Security w/I&D Sales" channel, group-based communication server 106 may recognize the controlling third-party for the file and the location/address of one or more APIs associated with. that third-party to integrate functionality associated with that application within the "Security w/I&D Sales" channel.

At step 710, group-based communication server 106 modifies the requested resource access control parameters to authorize access to the requested resource for every entry in the list of non-allowed global identifiers. Step 608 of process 600 describes group-based communication server 106 determining the list of non-allowed global identifiers. Using this list, group-based communication server 106 is able to transmit a requested resource access control parameters change object, according to the identified API, to a resource location to modify requested resource access control parameters in order to authorize access to every member of a group-based communication channel. In one embodiment, group-based communication server 106 determines one or more email addresses for each entry in the list of non-allowed global identifiers and includes these email addresses in the request resource access control parameters change object. By doing this for each entry, each entry on the list of non-allowed global identifiers will be authorized to access the requested resource. In another embodiment, if all (or some) of the email addresses corresponding to members of a group-based communication channel have the same top level domain, group-based communication server 106 may simply send a requested resource access control parameters change object to change the requested resource access control parameters to authorize access to any user associated with an email that belongs to the top level domain. In another embodiment, when a majority of the email addresses corresponding to members of a group-based communication channel have the same top level domain, group-based communication server 106 may send a send a requested resource access control parameters change object to change the requested resource access control parameters to authorize access to any user associated with an email that belongs to the top level domain and the requested resource access control parameters change object may also change the requested resource access control parameters to authorize access to users corresponding to individual emails that are associated with users authorized to access a group-based communication channel but do not belong to the top level domain. For example, if a document is shared with only @slack-corp.com email addresses (i.e., top level domain) and a member of a group-based communication channel has only an email address of bertandom@gmail.com then group-based communication server 106 will modify the access control parameters for the document to include the email bertandom@gmail.com and the @slack-corp.com top level domain.

For example, group-based communication server 106 may previously (i.e., before step 710) make an API call to a requested resource endpoint to check access to the requested resource. This API call may include email addresses of all the members of a group-based communication channel, a requested resource identifier that uniquely identifies the requested resource, and a minimum role identifier which indicates a minimum role for the email addresses. The minimum role may be for writing privileges, reading privileges, commenting privileges, or all privileges (e.g., writing, reading, and commenting). In response, the requested resource endpoint sends back a token that may be later used in a fixAccess API call to the requested resource endpoint in order to allow minimum role access for the previously indicated email addresses. Thus, group-based communication server 106 may automatically modify access control parameters of a requested resource.

At step 712 and group-based communication server 106 transmits, to the client device that sent the messaging communications in step 402, a notification indicating that every member of the group-based communication channel is authorized to access the resource address associated with the requested resource. An example of the notification is illustrated in FIG. 8C.

Although FIG. 7 describes an exemplary operation of group-based communication server 106 when an external application has been previously integrated. It is possible for group-based communication server 106 to modify requested resource access control parameters without an external application being previously integrated. For example, as previously described, an access link object may be provided by a client device to group-based communication server 106. In another example, group-based communication repository 107 may include a change request directory of change commands. In response to receiving a change option selection indication, group-based communication server 106 may search the change request directory of change commands to find a suitable change command. Group-based communication server 106 may use a requested resource identifier to query the change request directory of change commands to locate the suitable change command, which will contain a suitable change request protocol. Group-based communication server 106 may then use the retrieved change request protocol to alter a requested resource access control parameters.

FIG. 9 illustrates an exemplary group-based communication interface 900. Group-based communication interface 900 may be displayed on any suitable client device. Group-based communication interface 900 comprises group-based communication channel list pane 902, group-based communication channel communication pane 904, requested resource access control parameter change interface 906, and change option selection interface 908.

Group-based communication channel list pane 902 displays one or more group-based communication channels that a user of a client device is a member of group-based communication 106, may query group-based communication repository 107 using a user's global identifier to identify on or more stored group-based communication channel identifiers in a user's profile data. In another embodiment, group-based communication server 106 may query group-based communication repository 107 using a user's global identifier to identify one or more stored group identifiers in a user's profile data. Next, group-based communication server 106 may search all group-based communication channel access parameters stored in group-based communication repository 107 to determine which group-based communication channels a user has access to by virtue of the group identifiers in the user's profile data. Regardless of the determination, once group-based communication server 106 determines one or more group-based communication channels the user is a member of, it sends the client device corresponding. identifiers in a renderable group-based communication channel list pane object that when rendered will display group-based communication channel list pane 902.

Group-based communication channel communication pane 904 displays one or more messaging communications configured to display within a respective group-based communication channel. In FIG. 9, messaging communications in the "#announcement" group-based communication channel and the "#things-to-know" group-based communication channel are shown. A user of the client device may engage one or more group-based communication channels in the group-based communication channel pane to select a desired group-based communication channel. Once selected, the client device will transmit a group-based communication channel identifier to group-based communication server 106. Then group-based communication server 106 may query, using the group-based communication channel identifier, group-based communication repository 107 to find the most recent messaging communications configured to display in the selected channel and create a renderable group-based communication channel communication pane object containing these messaging communications. The group-based communication channel communication pane object when rendered will display group-based communication channel communication pane 904.

Requested resource access control parameter change interface 906 displays message 910 and option selection interface 908. Requested resource control parameter change interface 906 is displayed as a result of the client device receiving a renderable change request prompt object. The renderable change request prompt object is sent by group-based communication server 106 in response to a user of the client device, transmitting, via the client device, a messaging communication that is configured for display within a group-based communication channel that contains a requested resource with access parameters that do not allow all members the group-based communication access to the requested resource. The processes of determining when a user is not allowed to access a requested resource are detailed above.

The renderable change request prompt, when rendered, displays message 910 that indicates to a user that the requested resource is not accessible by everyone in the group-based communication channel. In addition, the renderable change request prompt includes an option selection interface 908 that is expandable upon user engagement (e.g., touching a touch screen, pointing and clicking a mouse.) Once expanded, option selection interface 908 displays several options for a user to choose from. An example embodiment is shown in more detail in FIG. 8B. It should be understood that FIGS. 8A-8B present a more detailed requested resource access control parameter change interface 800 than requested resource access control parameter change interface 906, and requested resource access control parameter change interface 906 includes all the functional of resource access control parameter change interface 800 and vice versa.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. One or more non-transitory computer-readable media that store computer-executable instructions that, when executed by at least one processor, perform a method for managing resource access control within a group-based communication system, the method comprising:
   receiving, from a client device, a resource request indicating a resource to be shared within a channel of the group-based communication system;
   responsive to receiving the resource request, determining that one or more existing users of the channel of the group-based communication system do not have access to the resource based on a set of resource access control parameters associated with the resource; and
   responsive to determining that the one or more existing users of the channel of the group-based communication system do not have access to the resource, generating a graphical user interface for display on the client device, the graphical user interface including:
      an indication of the resource;
      a notification indicating that the resource is not accessible by the one or more existing users of the channel of the group-based communication system; and
      a change option selection interface object for changing the set of resource access control parameters associated with the resource.

2. The one or more non-transitory computer-readable media of claim 1, wherein the change option selection interface object comprises a list interface that provides a list of options for changing the set of resource access control parameters.

3. The one or more non-transitory computer-readable media of claim 2, wherein the list interface includes at least one of:
a viewing access option;
a commenting access option; and
an editing access option.

4. The one or more non-transitory computer-readable media of claim 3, wherein the list interface further comprises one or more options to change access permissions associated with the resource.

5. The one or more non-transitory computer-readable media of claim 1, wherein the graphical user interface further includes a resource service provider indicator indicating a service provider associated with the resource.

6. The one or more non-transitory computer-readable media of claim 5, wherein the resource service provider indicator is associated with a third party application external from the group-based communication system.

7. The one or more non-transitory computer-readable media of claim 1, wherein the resource is shared within the channel of the group-based communication system.

8. A method for managing resource access control within a group-based communication system, the method comprising:
receiving, from a client device, a resource request indicating a resource to be shared within a channel of the group-based communication system;
responsive to receiving the resource request, determining that one or more existing users of the channel of the group-based communication system do not have access to the resource based on a set of resource access control parameters associated with the resource; and
responsive to determining that the one or more existing users of the channel of the group-based communication system do not have access to the resource, generating a graphical user interface for display on the client device, the graphical user interface including:
an indication of the resource;
a notification indicating that the resource is not accessible by the one or more existing users of the channel of the group-based communication system; and
a change option selection interface object for changing the set of resource access control parameters associated with the resource.

9. The method of claim 8, wherein the change option selection interface object comprises a list interface that provides a list of options for changing the set of resource access control parameters.

10. The method of claim 9, wherein the list interface includes at least one of:
a viewing access option;
a commenting access option; and
an editing access option.

11. The method of claim 10, wherein the list interface further comprises one or more options to change access permissions associated with the resource.

12. The method of claim 8, wherein the graphical user interface further includes a resource service provider indicator indicating a service provider associated with the resource.

13. The method of claim 12, wherein the resource service provider indicator is associated with a third party application external from the group-based communication system.

14. The method of claim 8, wherein the resource is shared within the channel of the group-based communication system.

15. A system for managing resource access control within a group-based communication system, the system comprising:
a group-based communication repository storing information related to the group-based communication system; and
at least one physical processor programmed to perform a method for managing the resource access control within the group-based communication system, the method comprising:
receiving, from a client device, at the at least one physical processor, a resource request indicating a resource to be shared within a channel of the group-based communication system;
responsive to receiving the resource request, determining, by the at least one physical processor, that one or more existing users of the channel of the group-based communication system do not have access to the resource based on a set of resource access control parameters associated with the resource; and
responsive to determining that the one or more existing users of the channel of the group-based communication system do not have access to the resource, generating, by the at least one physical processor, a graphical user interface for display on the client device, the graphical user interface including:
an indication of the resource;
a notification indicating that the resource is not accessible by the one or more existing users of the channel of the group-based communication system; and
a change option selection interface object for changing the set of resource access control parameters associated with the resource.

16. The system of claim 15, wherein the change option selection interface object comprises a list interface that provides a list of options for changing the set of resource access control parameters.

17. The system of claim 16, wherein the list interface includes at least one of:
a viewing access option;
a commenting access option; and
an editing access option.

18. The system of claim 17, wherein the list interface further comprises one or more options to change access permissions associated with the resource.

19. The system of claim 15, wherein the graphical user interface further includes a resource service provider indicator indicating a service provider associated with the resource.

20. The system of claim 19, wherein the resource service provider indicator is associated with a third party application external from the group-based communication system.

* * * * *